(12) United States Patent
Bendig et al.

(10) Patent No.: US 10,366,114 B2
(45) Date of Patent: Jul. 30, 2019

(54) PROVIDING DATA PRESENTATION FUNCTIONALITY ASSOCIATED WITH COLLABORATION DATABASE

(71) Applicant: MICROSOFT TECHNOLOGY LICENSING, LLC, Redmond, WA (US)

(72) Inventors: Krista Bendig, Redmond, WA (US); Nathan Penner, Redmond, WA (US); Travis Eby, Redmond, WA (US); Yi Li, Redmond, WA (US); Felicia Werchan, Redmond, WA (US); Daniel McAllister, Redmond, WA (US); Mark Peterson, Redmond, WA (US); Raul Clouse, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 401 days.

(21) Appl. No.: 15/196,082

(22) Filed: Jun. 29, 2016

(65) Prior Publication Data

US 2017/0139927 A1 May 18, 2017

Related U.S. Application Data

(60) Provisional application No. 62/255,515, filed on Nov. 15, 2015.

(51) Int. Cl.
*G06F 16/332* (2019.01)
*G06F 16/26* (2019.01)
(Continued)

(52) U.S. Cl.
CPC ........ *G06F 16/3322* (2019.01); *G06F 3/0482* (2013.01); *G06F 3/04812* (2013.01);
(Continued)

(58) Field of Classification Search
CPC .......... G06F 17/3064; G06F 17/30864; G06F 17/30011; G06F 17/30545;
(Continued)

(56) References Cited

U.S. PATENT DOCUMENTS

| 4,484,826 A | 11/1984 | Horn et al. |
| 5,588,099 A | 12/1996 | Mogilevsky et al. |

(Continued)

FOREIGN PATENT DOCUMENTS

| EP | 2891970 A1 | 7/2015 |
| WO | 9933007 A1 | 7/1999 |

OTHER PUBLICATIONS

"International Search Report and Written Opinion Issued in PCT Application No. PCT/US2016/060764", dated Dec. 20, 2016, 9 Pages.

(Continued)

*Primary Examiner* — James Trujillo
*Assistant Examiner* — Hubert Cheung
(74) *Attorney, Agent, or Firm* — Scott Y. Shigeta; Newport IP, LLC

(57) ABSTRACT

Data presentation functionality associated with a collaboration database may be provided. A presentation of a table in conjunction with a collaboration database may be detected. At least one field in the table that includes people type data may also be detected. Initial letters associated with a person or an entity may be detected as input into the at least one field. A type of entry of the initial letters may be detected. A local data source may be searched to identify matching entries. Suggestions may then be displayed. If one of the suggestions is selected, additional information associated with the selected suggestion may be displayed on a contact card in a vicinity of the at least one field. An interactive functionality associated with the additional information (Continued)

through the contact card may be provided upon selection of the at least one field when the table is presented.

20 Claims, 17 Drawing Sheets

(51) Int. Cl.
| | | |
|---|---|---|
| G06F 16/176 | (2019.01) | |
| G06F 16/245 | (2019.01) | |
| G06F 16/25 | (2019.01) | |
| G06F 16/22 | (2019.01) | |
| G06F 16/2458 | (2019.01) | |
| G06F 3/0481 | (2013.01) | |
| G06F 3/0482 | (2013.01) | |
| H04L 29/08 | (2006.01) | |
| G06F 17/24 | (2006.01) | |
| G06F 17/22 | (2006.01) | |
| G06Q 10/10 | (2012.01) | |
| G06F 16/93 | (2019.01) | |
| G06F 16/951 | (2019.01) | |

(52) U.S. Cl.
CPC ........ *G06F 3/04817* (2013.01); *G06F 16/176* (2019.01); *G06F 16/221* (2019.01); *G06F 16/2282* (2019.01); *G06F 16/2471* (2019.01); *G06F 16/252* (2019.01); *G06F 16/93* (2019.01); *G06F 16/951* (2019.01); *G06F 17/245* (2013.01); *G06F 17/246* (2013.01); *G06Q 10/101* (2013.01)

(58) Field of Classification Search
CPC ......... G06F 17/30315; G06F 17/30572; G06F 17/30165; G06F 17/3056; G06F 17/30424; G06F 17/30339; G06F 17/30303; G06F 3/0482; G06F 3/04812; G06F 3/04847; G06F 3/048; G06F 8/3517; G06F 3/04; G06F 17/246; G06F 17/245; G06F 17/2288; G06F 16/3322; G06F 16/951; G06F 16/93; G06F 16/2471; G06F 16/2282; G06F 16/252; G06F 16/245; G06F 16/221; G06F 16/215; G06F 16/176; G06F 3/04817; G06F 8/35; H04L 67/20; H04L 67/306; H04L 67/02; H04L 65/403; H04L 51/046; G06Q 10/101

See application file for complete search history.

(56) References Cited

U.S. PATENT DOCUMENTS

| | | | |
|---|---|---|---|
| 5,721,912 A | 2/1998 | Stepczyk et al. | |
| 5,808,914 A | 9/1998 | Shin et al. | |
| 5,950,190 A | 9/1999 | Yeager et al. | |
| 6,014,138 A | 1/2000 | Cain et al. | |
| 6,044,383 A | 3/2000 | Suzuki et al. | |
| 6,055,550 A | 4/2000 | Wallack | |
| 6,208,340 B1 | 3/2001 | Amin et al. | |
| 6,232,984 B1 | 5/2001 | Chuah et al. | |
| 6,279,008 B1 | 8/2001 | Tung Ng et al. | |
| 6,295,550 B1 | 9/2001 | Choung et al. | |
| 6,639,611 B1 | 10/2003 | Leduc | |
| 6,661,417 B1 | 12/2003 | Cheng | |
| 7,089,504 B1 | 8/2006 | Froloff | |
| 7,143,339 B2 | 11/2006 | Weinberg et al. | |
| 7,167,731 B2 | 1/2007 | Nelson | |
| 7,370,290 B2* | 5/2008 | Grossman ............. | G06Q 10/10 715/744 |
| 7,379,075 B2 | 5/2008 | Opstad et al. | |
| 7,523,395 B1 | 4/2009 | Namait et al. | |
| 7,543,237 B2 | 6/2009 | Kontny et al. | |
| 7,810,033 B2 | 10/2010 | Cordes et al. | |
| 7,853,961 B2 | 12/2010 | Nori et al. | |
| 8,046,677 B2 | 10/2011 | Eischeid | |
| 8,065,658 B1 | 11/2011 | Bali et al. | |
| 8,312,367 B2 | 11/2012 | Foster | |
| 8,386,609 B2 | 2/2013 | Anand et al. | |
| 8,484,560 B2 | 7/2013 | Vuong et al. | |
| 8,484,562 B2 | 7/2013 | Schorsch | |
| 8,610,718 B2 | 12/2013 | Suntinger et al. | |
| 8,615,707 B2 | 12/2013 | Fortuna et al. | |
| 8,626,795 B2 | 1/2014 | Jacobson et al. | |
| 8,938,690 B1* | 1/2015 | Khouri ................... | G06Q 50/01 709/205 |
| 9,087,320 B2 | 7/2015 | Goldman et al. | |
| 9,202,249 B1 | 12/2015 | Cohen et al. | |
| 9,244,802 B2 | 1/2016 | Yalovsky et al. | |
| 2002/0047858 A1 | 4/2002 | Bayliss et al. | |
| 2003/0028560 A1 | 2/2003 | Kudrolli et al. | |
| 2003/0142147 A1 | 7/2003 | Chen et al. | |
| 2003/0187716 A1 | 10/2003 | Lee | |
| 2004/0122683 A1* | 6/2004 | Grossman ............. | G06Q 10/10 715/864 |
| 2005/0187956 A1 | 8/2005 | Sylvester et al. | |
| 2005/0208971 A1 | 9/2005 | Pappalardo et al. | |
| 2005/0275655 A1 | 12/2005 | Stolze et al. | |
| 2005/0278282 A1 | 12/2005 | Sheridan | |
| 2006/0053386 A1 | 3/2006 | Kuhl et al. | |
| 2006/0101351 A1 | 5/2006 | Cowham | |
| 2006/0195476 A1 | 8/2006 | Nori et al. | |
| 2006/0230032 A1 | 10/2006 | Brankov et al. | |
| 2007/0016575 A1* | 1/2007 | Hurst-Hiller ......... | H04L 67/306 |
| 2007/0136654 A1 | 6/2007 | Peters | |
| 2007/0208992 A1 | 9/2007 | Koren | |
| 2007/0211062 A1 | 9/2007 | Engelman et al. | |
| 2007/0288318 A1 | 12/2007 | Gupta et al. | |
| 2008/0028290 A1 | 1/2008 | Suwiryo | |
| 2009/0083614 A1 | 3/2009 | Wedekind | |
| 2009/0158189 A1 | 6/2009 | Itani | |
| 2010/0049683 A1 | 2/2010 | Carter | |
| 2010/0082536 A1 | 4/2010 | Cosic | |
| 2010/0174734 A1 | 7/2010 | Norbauer et al. | |
| 2010/0325173 A1 | 12/2010 | Haley et al. | |
| 2011/0093471 A1 | 4/2011 | Brockway et al. | |
| 2011/0175820 A1 | 7/2011 | Toba | |
| 2011/0191303 A1 | 8/2011 | Kaufman et al. | |
| 2011/0276868 A1 | 11/2011 | Hoke et al. | |
| 2012/0117105 A1 | 5/2012 | Thomas et al. | |
| 2013/0046544 A1* | 2/2013 | Kay ....................... | G06F 3/04883 704/275 |
| 2013/0047093 A1 | 2/2013 | Reuschel et al. | |
| 2013/0061121 A1 | 3/2013 | Thomsen | |
| 2013/0066922 A1 | 3/2013 | Jang et al. | |
| 2013/0144855 A1* | 6/2013 | Kaul ...................... | G06F 16/951 707/706 |
| 2013/0218923 A1* | 8/2013 | Kaul .................. | H04M 1/72522 707/769 |
| 2014/0012922 A1 | 1/2014 | Wu | |
| 2014/0032486 A1 | 1/2014 | Sharma et al. | |
| 2014/0059496 A1 | 2/2014 | White et al. | |
| 2014/0164944 A1 | 6/2014 | Sivakumar et al. | |
| 2014/0181703 A1 | 6/2014 | Sullivan et al. | |
| 2014/0208212 A1 | 7/2014 | Affronti et al. | |
| 2014/0237356 A1* | 8/2014 | Durga ................... | G06F 17/276 715/256 |
| 2014/0245119 A1 | 8/2014 | Barrus et al. | |
| 2014/0245120 A1 | 8/2014 | Schwartz et al. | |
| 2014/0310649 A1 | 10/2014 | Bernstein et al. | |
| 2014/0317116 A1 | 10/2014 | Shah et al. | |
| 2014/0344304 A1* | 11/2014 | Topatan ................. | G06Q 30/02 707/767 |
| 2014/0379699 A1 | 12/2014 | Blyumen | |
| 2015/0046530 A1 | 2/2015 | Mieritz et al. | |
| 2015/0169733 A1 | 6/2015 | Motamedi et al. | |
| 2015/0331578 A1 | 11/2015 | Keslin et al. | |
| 2016/0248837 A1 | 8/2016 | Cai et al. | |
| 2017/0010771 A1* | 1/2017 | Bernstein ................ | G06F 1/165 |
| 2017/0118267 A1 | 4/2017 | Philippov et al. | |
| 2017/0139884 A1 | 5/2017 | Bendig et al. | |

(56) References Cited

U.S. PATENT DOCUMENTS

2017/0139890 A1  5/2017  Bendig et al.
2017/0139958 A1  5/2017  Bendig et al.
2017/0140047 A1  5/2017  Bendig et al.

OTHER PUBLICATIONS

Red, Paul, "How to create customized dashboards for your users", Retrieved on: May 30, 2016 Available at: https://www.docebo.com/knowledge-base/customized-users-dashboards/.
"Adding people to a board", Published on: Sep. 3, 2015 Available at: http://help.trello.com/article/717-adding-people-to-a-board.
"ReportPlus v4.0 User Guide", Published on: Nov. 1, 2015 Available at: http://dl.infragistics.com/reportplus/help/ReportPlus-v4.0-UserGuide.html.
"Managing Users", Retrieved on: May 30, 2016 Available at: https://www.zoho.com/reports/help/managing-users.html.
Joe, "CRM 2011 Actionable Goal Charts and Dashboards", Published on: Apr. 25, 2011 Available at: http://www.powerobjects.com/2011/04/25/crm-2011-actionable-goal-charts-and-dashboards/.
"About Fusion Tables", Retrieved From: https://support.google.com/fusiontables/answer/2571232, Oct. 29, 2012, 4 Pages.
"Collaborative Database", Retrieved From: https://www.eda.europa.eu/what-we-do/activities/activities-search/collaborative-database, Mar. 11, 2015, 3 Pages.
"Create with Fusion Tables", Retrieved From: https://support.google.com/fusiontables/answer/184641?hl=en, Feb. 21, 2013, 2 Pages.
"Design Your Database Online", Retrieved From: https://www.vertabelo.com/, Sep. 9, 2014, 5 Pages.
"Force.com: A Comprehensive Look at the World's Premier Cloud-Computing Platform", In White Paper of SalesForce.com, Aug. 6, 2009, 30 Pages.
"Make an Online Collaborative Database in a Few Minutes", Retrieved From: https://web.archive.org/web/20130410042142/http://acropora.bio.mq.edu.au/resources/make-an-online-collaborative-database-in-a-few-minutes/, Apr. 10, 2013, 5 Pages.
"Non Final Office Action Issued in U.S. Appl. No. 15/196,087", dated Oct. 29, 2018, 18 Pages.
"Non Final Office Action Issued in U.S. Appl. No. 15/198,236", dated Oct. 3, 2018, 16 Pages.
Anslow, Craig, "Multi-touch Table User Interfaces for Collaborative Visual Software Analytics", A Thesis Submitted in Partial Fulfillment of the Requirements of the Victoria University of Wellington for the Degree of Doctor of Philosophy, Sep. 2010, 149 Pages.
Bort, Julie, "Google Introduces Fusion Tables for Database Collaboration, Visualization", Retrieved From: http://www.networkworld.com/article/2236073/opensource-subnet/google-introduces-fusion-tables-for-database-collaboration--visualization.html, Jun. 11, 2009, 2 Pages.
Csinger, Andrew, "User Models for Intent-Based Authoring", A Thesis Submitted in Partial Fulfillment of the Requirements of the University of British Columbia for the Degree of Doctor of Philosophy, Nov. 1995, 202 Pages.
Fuchs, et al., "Collaborative Data Analysis with Smart Tangible Devices", In Proceedings of International Society for Optics and Photonics, Feb. 3, 2014, 15 Pages.
Lin, Xiaofan, "Active Document Layout Synthesis", In Proceedings of Eighth International Conference on Document Analysis and Recognition, Aug. 31, 2005, 5 Pages.
"International Search Report and Written Opinion Issued in PCT Application No. PCT/US2016/060761", dated Dec. 14, 2016, 8 Pages.
"International Search Report and Written Opinion Issued in PCT Application No. PCT/US2016/060762", dated Dec. 20, 2016, 11 Pages.
"International Preliminary Report on Patentability Issued in PCT Application No. PCT/US2016/060766", dated Jan. 31, 2018, 7 Pages.
"International Search Report and Written Opinion for PCT Application No. PCT/US2016/060766", dated Dec. 19, 2016, 11 Pages.
"Second Written Opinion Issued in PCT Application No. PCT/US2016/060766", dated Sep. 13, 2017, 6 Pages.
"International Search Report and Written Opinion Issued in PCT Application No. PCT/US2016/060767", dated Dec. 19, 2016, 6 Pages.
Strom, David, "Simple Online Database Collaboration", Retrieved From: http://www.itworld.com/article/2826377/enterprise-software/simple-online-database-collaboration.html, Mar. 18, 2010, 2 Pages.
"Non Final Office Action Issued in U.S. Appl. No. 15/197,788", dated Jan. 10, 2019, 10 Pages.
"Non Final Office Action Issued in U.S. Appl. No. 15/198,375", dated Jan. 11, 2019, 11 Pages.
"Final Office Action Issued in U.S. Appl. No. 15/198,236", dated Apr. 29, 2019, 19 Pages.

* cited by examiner

PROVIDING DATA PRESENTATION FUNCTIONALITY ASSOCIATED WITH COLLABORATION DATABASE

CROSS-REFERENCE TO RELATED APPLICATION

This application claims priority under 35 U.S.C. § 119(e) to U.S. Provisional Patent Application Ser. No. 62/255,515 filed on Nov. 15, 2015. The disclosure of the U.S. Provisional patent application is hereby incorporated by reference in its entirety.

BACKGROUND

Productivity applications (e.g., a word-processing application, a spreadsheet application, a presentation application, or a notebook application, among other examples) may be executed in collaborative environments. The productivity applications may enable multiple users to co-author a document or a file. For example, the productivity applications may allow the users to create, edit, and share content, where formatting may be used to convey a meaning of the content.

Databases include a collection of custom entities that allow the user to configure the actual semantics of content, rather than using formatting to convey the meaning of the content. However, the databases are unapproachable to the average user. Additionally, the databases are not optimized for collaborative editing and data sharing at the level of the end-user.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing data presentation functionality associated with a collaboration database. A presentation of a table in conjunction with a collaboration database may be detected. At least one field in the table that includes people type data may also be detected. Initial letters associated with a person or an entity may be detected as input into the at least one field. A type of entry of the initial letters may be detected. A local data source may be searched to identify matching entries. Suggestions may then be displayed. If one of the suggestions is selected, additional information associated with the selected suggestion may be displayed on a contact card in a vicinity of the at least one field. An interactive functionality associated with the additional information through the contact card may be provided upon selection of the at least one field when the table is presented.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
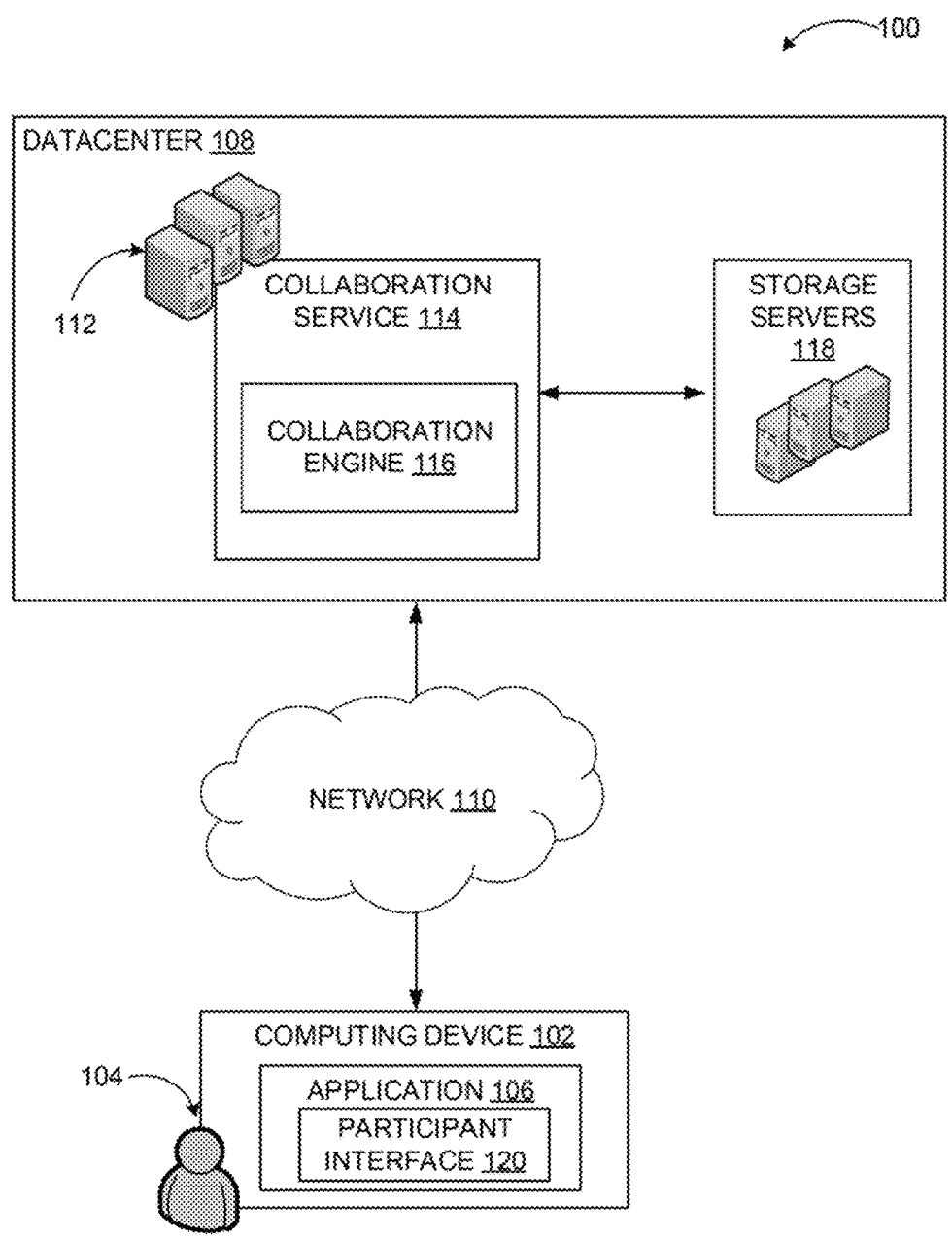
FIG. 1 is a conceptual diagram illustrating an example computing environment for providing data presentation functionality associated with a collaboration database, according to embodiments.

As briefly described above, providing data presentation functionality associated with a collaboration database is described. A presentation of a table in conjunction with a collaboration database may be detected. At least one field in the table that includes people type data may also be detected. Initial letters associated with a person or an entity may be detected as input into the at least one field. A type of entry of the initial letters may be detected. A local data source may be searched to identify matching entries. Suggestions may then be displayed. If one of the suggestions is selected, additional information associated with the selected suggestion may be displayed on a contact card in a vicinity of the at least one field. An interactive functionality associated with the additional information through the contact card may be provided upon selection of the at least one field when the table is presented.

According to some examples, upon detecting a participant interest in one of the suggestions based on one of a hover action and a highlight action executed on the displayed suggestion, the collaboration engine may provide the additional information. The additional information may include a name, an address, an email address, a title, a telephone number, a salary, a global positioning system (GPS) identifier, a graphic file, an audio file, notes, a map, a link to a website, an attachment, and/or another communication identifier. In other examples, if a matching entry is not found at the local data source, the collaboration engine may be configured to search through an external data source to locate the matching entry. The external data source may include a social network database, professional network database, and/or an external directory.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing data presentation functionality associated with a collaboration database. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using tables herein, embodiments are not limited to tables. Providing data presentation functionality associated with a collaboration database may be implemented in other environments, such as online conferencing and similar communications, where data may be exchanged.

The technical advantages of providing data presentation functionality associated with a collaboration database may include, among others, an increased integration and interoperation with various other productivity application workloads. Each productivity application plays a specific role. The strengths of each productivity application may be distinguished in an example collaboration service that brings a system together. Further, a collaboration database service may improve participant interactivity by allowing participants to create, edit, and view more secure data without having to interact with complex database systems.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with communications.

FIG. 1 is a conceptual diagram illustrating an example computing environment for providing data presentation functionality associated with a collaboration database, according to at least some embodiments disclosed herein.

As illustrated in a diagram 100, an example system may include a datacenter 108. The datacenter 108 may host a collaboration service 114. The collaboration service 114 may provide data presentation functionality associated with a collaboration database. The datacenter 108 may include processing servers 112. At least one of the processing servers 112 may execute a collaboration engine 116 of the collaboration service 114, among other components. The datacenter 108 may also include storage servers 118. The storage servers 118 may be configured to manage one or more data stores. The one or more data stores may comprise data associated with the collaboration engine 116. As described herein, the collaboration engine 116 may be implemented as software, hardware, or a combination thereof.

According to some examples, the collaboration service 114 may be configured to be integrated with numerous applications. A participant 104 may execute a thin version (e.g., a web browser) of an application 106 through a computing device 102. The computing device 102 may include a desktop computer, a laptop computer, a tablet computer, a smart phone, a vehicle mount computer, or a wearable computer, among other devices. In other examples, the participant 104 may execute a thick version (e.g., a locally-installed version) of the application 106 through the computing device 102.

The collaboration service 114 may be configured to interact with the application 106 over one or more networks, such as a network 110. The network 110 may comprise any topology of servers, clients, Internet service providers, and communication media. In some examples, the application 106 may be a productivity application. The productivity application may include a word-processing application, a spreadsheet application, a presentation application, or a notebook application, among other examples. According to other examples, the application 106 may be hosted by the collaboration service 114. A participant interface 120 may facilitate communication over the network 110 and between the collaboration service 114 and the application 106.

In some examples, the application 106 may be executed on a server. The server may be configured to provide data presentation functionality associated with the collaboration database. The server may include a communication module, a memory, and a processor. The communication module may be configured to facilitate communication between the collaboration service 114, a plurality of client applications, and one or more other services. The one or more other services may include a Global Positioning Service (GPS), a scheduling service, and/or a presence service, among others. The memory may be configured to store instructions. The processor may be coupled to the memory. The processor may be configured to execute, in conjunction with the instructions stored in the memory, the collaboration service 114 and the collaboration engine 116 integrated with the collaboration service 114.

The application 106 may enable multiple participants to co-author a document or a file. In examples, the application 106 may allow the multiple participants to create, edit, and share content, where formatting may be used to convey a meaning of the content. According to some examples, the collaboration engine 116 may be configured to detect a presentation of a table on the participant interface 120 in conjunction with the collaboration database and at least one field in the table that includes people type data. The table may include a tabular region of rows and columns of cells. In some examples, each row of the table may represent a task of a project.

In response to detecting one or more initial letters associated with a person or an entity being input into the at least one field, the collaboration engine 116 may be configured to detect a type of entry. The collaboration engine 116 may also search through a local data source for matching entries. The collaboration engine 116 may then provide suggestions to be displayed. Then, if one of the suggestions is selected, the collaboration engine 116 may be configured to provide additional information associated with the selected suggestion on a contact card. The contact card may be displayed on the participant interface 120 in a vicinity of the at least one field.

The collaboration engine 116 may be further configured to provide an interactive functionality associated with the additional information through the contact card upon selection of the at least one field when the table is presented. For example, the collaboration engine 116 may allow the participant 104 to modify associated fields, rows, and columns of the table through the participant interface 120 of the application 106.

While the example system in FIG. 1 has been described with specific components including the computing device 102, the application 106, the datacenter 108, the processing servers 112, the collaboration service 114, the collaboration engine 116, the storage servers 118, and the participant interface 120, embodiments are not limited to these components or system configurations and can be implemented with other system configuration employing fewer or additional components.

Figure 2A:
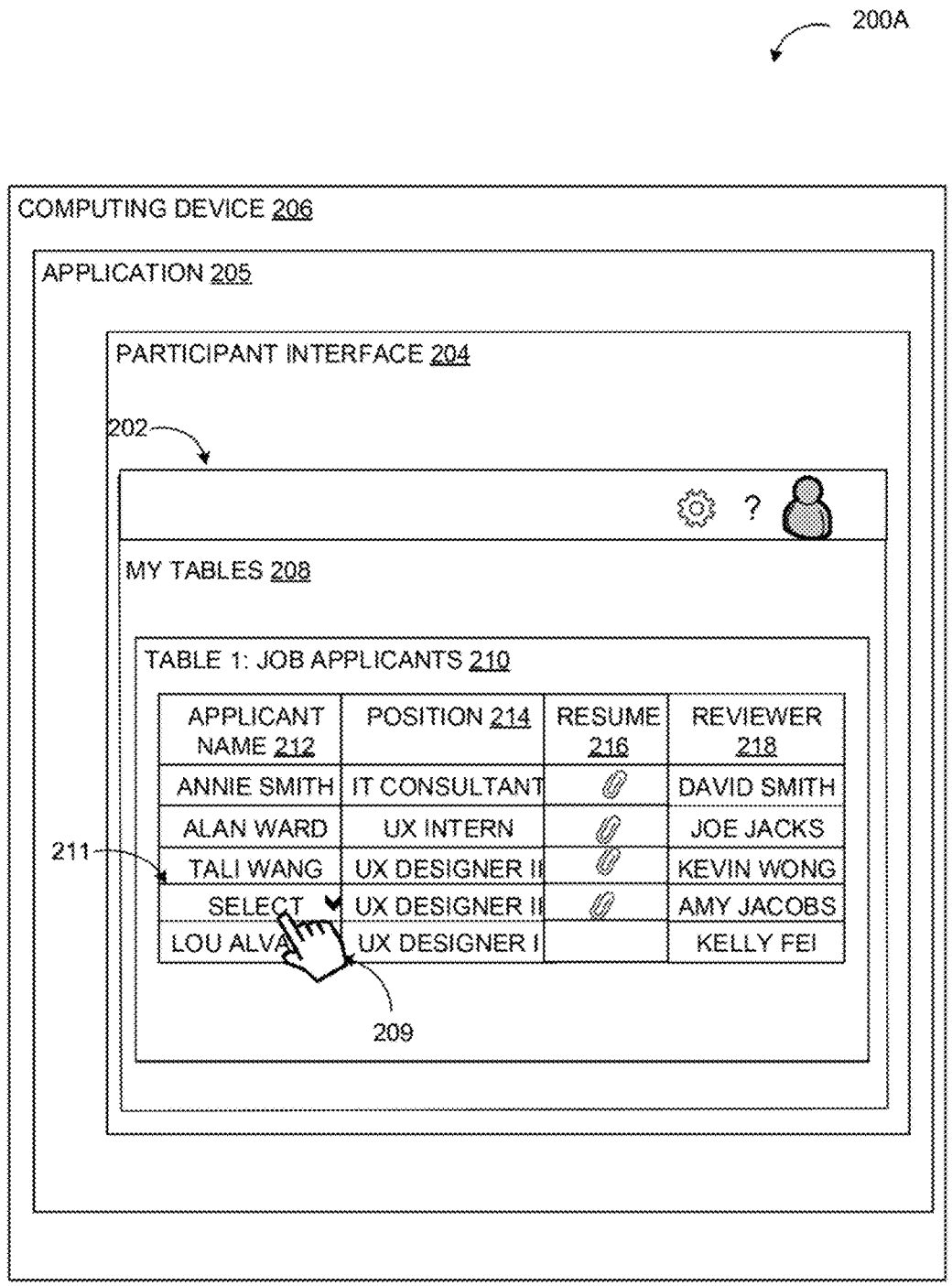
FIG. 2A is a display diagram illustrating detection of a presentation of a table in conjunction with the collaboration database, according to embodiments.

FIG. 2A is a display diagram illustrating detection of a presentation of a table in conjunction with the collaboration database, according to embodiments disclosed herein.

As shown in a diagram 200A, a collaboration service may include a collaboration engine. A participant may execute a thin version (e.g., a web browser 202) of an application 205 through a computing device 206. The collaboration service may be configured to interact with the application 205 over one or more networks. A participant interface 204 may facilitate communication over one or more networks and between the collaboration service and the application 205.

In some examples, the collaboration engine may be configured to detect a presentation of one or more tables 208 on the participant interface 204 in conjunction with the collaboration database. The one or more tables 208 may present a default label (e.g., "My Tables"). In other examples, a first table 210 of the one or more tables 208 may represent a table of job applicants. The collaboration engine may allow the participant to customize a title of the first table 210 by executing a modification action on settings associated with the first table 210. The first table 210 may include at least one field that includes people type data. The people type data may include contact information and context information associated with one or more of the person or the entity. The entity may include one of an organization, a company, and a group.

The first table 210 may include several columns, such as a first column 212, a second column 214, a third column 216, and/or a fourth column 218, among others. The first column 212 may include a name of an applicant (e.g., "Annie Smith," "Alan Ward," or "Tali Want," etc.). The second column 214 may include a job position the name of the applicant is applying for (e.g., "IT consultant," "UX Intern," or "UX Designer II," etc.). The third column 216 may or may not include an attached resume. The fourth column 218 may include a name of a reviewer of the resume of the applicant (e.g., "David Smith," "Joe Jacks," or "Kevin Wong," etc.).

In some examples, each row in the first table 210 may have a lifecycle, a version history, and a set of permissions. For example, a first row of the first table 210 may include a first lifecycle, a first version history, and a first set of permissions associated with job applicants during a time period. The information for each applicant may be tracked by a company during the time period. The information for each job applicant may be accessible to and managed by different groups of people. While the collaboration database may contain thousands of job applicant's, it may be unlikely that a single participant would view all of the data at once. To view desired properties, the participant may execute modification actions on the first table 210 to modify the display of the rows and columns to view condensed set of data, which may be easier to analyze.

The collaboration engine may detect an input action 209 executed on a field 211 (or a cell) in the first column 212 (e.g., the name of the applicant) of the first table 210 to select an applicant from a list of potential applicants (e.g., "Lou Alvarez," "Kelly Fei," or "Scott Albright"). In response, the collaboration engine may present a drop-down menu, a pop-up menu, a fly-out menu, and/or a textual entry box on the participant interface 204. The drop-down menu, the pop-up menu, the fly-out menu, and/or the textual entry box may be populated with the list of potential applicants (e.g., "Lou Alvarez," "Kelly Fei," or "Scott Albright"). The collaboration engine may then receive a selection (e.g., "Scott Albright") from the list of potential applicants (e.g., "Lou Alvarez," "Kelly Fei," or "Scott Albright"). In response, the collaboration engine may display the selected applicant (e.g., "Scott Albright") in the field 211.

Figure 2B:
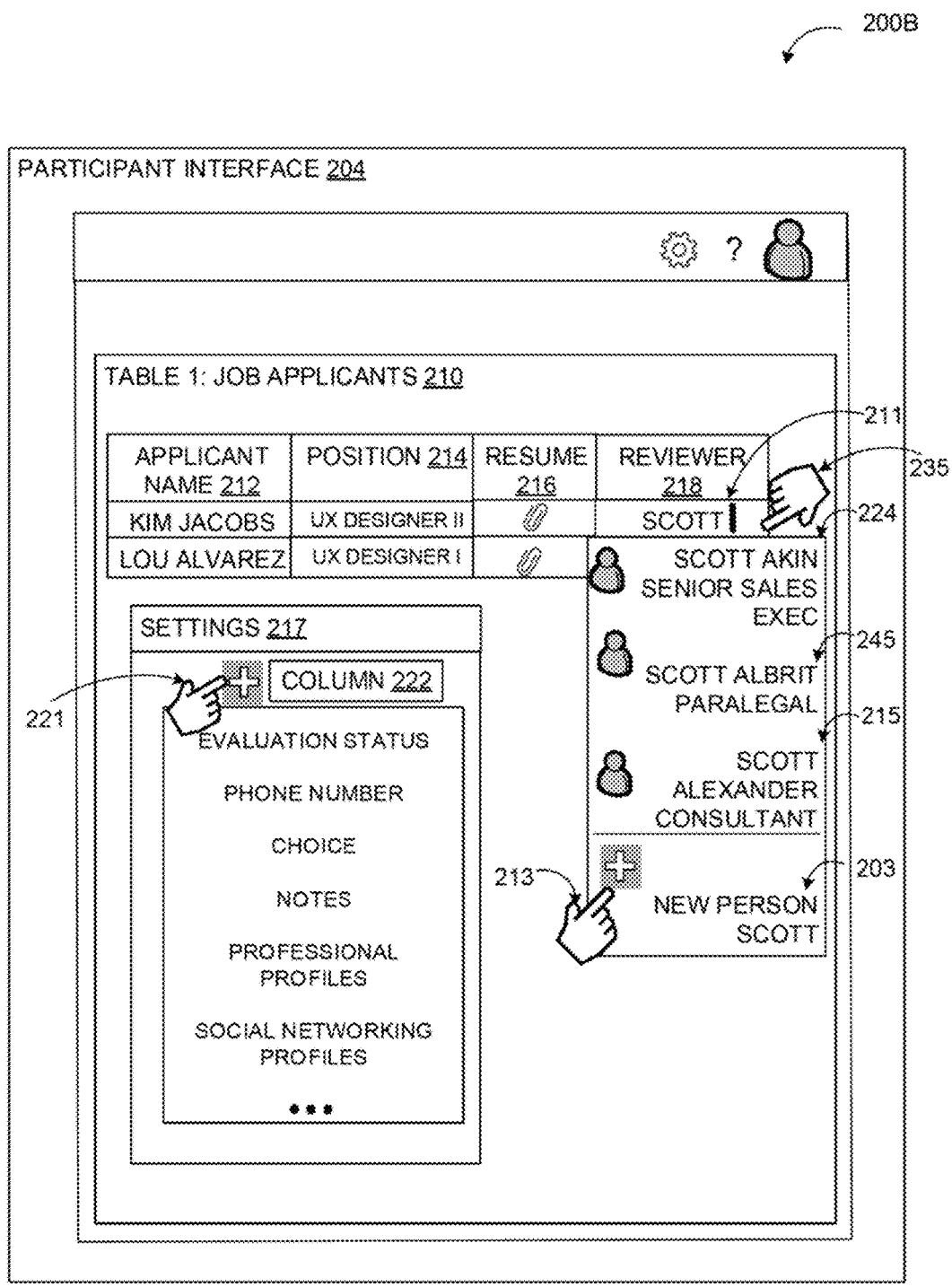
FIG. 2B is a display diagram illustrating detection of one or more initial letters associated with a person or an entity being input into at least one field of a table in conjunction with a collaboration database, according to embodiments.

FIG. 2B is a display diagram illustrating detection of one or more initial letters associated with a person or an entity being input into at least one field of a table in conjunction with a collaboration database, according to at least some embodiments disclosed herein.

As shown in a diagram 200B, the collaboration engine may be configured to detect a presentation of a first table 210 on the participant interface 204. The first table 210 may include parameters and characteristics associated with applicants applying for a job. The first table 210 may include the field 211 (or the cell) that includes people type data. The first table 210 may include several columns, such as a first column 212, a second column 214, a third column 216, and/or a fourth column 218, among others. The first column 212 may include a name of an applicant. The second column 214 may include a job position the name of the applicant is applying for. The third column 216 may or may not include an attached resume. The fourth column 218 may include a name of a reviewer of the resume of the applicant.

In some examples, the collaboration engine may detect one or more initial letters (e.g., "SCOTT") associated with a person or an entity being input into the field 211 (or cell) of the first table 210 by use of an input action 209. The input action 209 may include a textual entry input, among other examples. The collaboration engine may then detect a type of entry of the one or more initial letters. The type of entry may include a name, an address, an email address, a title, a telephone number, and/or another communication identifier. The collaboration engine may then search through a local data source for matching entries. The matching entities share a keyword, a syntax modifier, and/or a portion of the keyword, among others.

The collaboration engine may then provide a first suggestion 224, a second suggestion 245, and/or a third suggestion 215 to be displayed on the participant interface 204. The local source may include a personal address book, an organizational directory, and/or the collaborative database. The first suggestion 224, the second suggestion 245, and/or the third suggestion 215 may be displayed as graphical control elements on the participant interface 204. In other examples, the first suggestion 224, the second suggestion 245, and/or the third suggestion 215 may be displayed as text on one of a drop-down menu, a pop-up menu, or fly-out menu on the participant interface 204. The first suggestion 224, the second suggestion 245, and/or the third suggestion 215 may be displayed with a name and/or additional information associated with the suggestions.

In further examples, if a matching entry is not found at the local data source, the collaboration engine may search through an external data source to locate the matching entry. The external data source may include a social network database, professional network database, and/or an external directory. In other examples, the participant may wish to add a new suggestion 203 to the field 211. The participant may execute a selection action 213 on the graphical control elements, the drop-down menu, the pop-up menu, or the fly-out menu on the participant interface 204 to add the new suggestion 203 to the field 211.

In additional examples, the participant may wish to modify a design and/or a layout of the table. The collaboration engine may allow the participant to add, modify, or delete rows, columns, or fields of the first table 210 by executing a modification action 221 on settings 217 associated with the first table 210. For example, the participant may execute the modification action 221 on a column graphical icon 222 to add one or more new columns to the first table 210. The one or more new columns may include an evaluation status column (e.g., pending, completed, not started yet, etc.), a telephone number column, a choice column customized by participant input, a notes column, a professional networking profile column, a priority level column (e.g., high priority, low priority, etc.) and/or a social networking profile column, among others.

In other examples, the collaboration engine may detect a participant interest in one of the suggestions based on one of a hover action and a highlight action executed on a displayed suggestion. For example, the collaboration engine may detect the hover action executed on the first suggestion 224. In response, the collaboration engine may provide the additional information associated with the first suggestion 224 on the participant interface 204.

After any modifications are made to the first table 210, the updated table may be stored locally at local storage of the computing device and/or remotely at the data stores managed by the storage servers of the collaboration database service, or by third party storage services, for example. In some embodiments, the updated data may be sent to other participants who are collaborating with the participant on the first table 210. As described, the collaboration database service may provide easy creation and sharing of various databases across devices and may integrate and interoperate with various productivity application workloads. The collaboration database service may allow the participants to define custom entities.

Figure 2C:
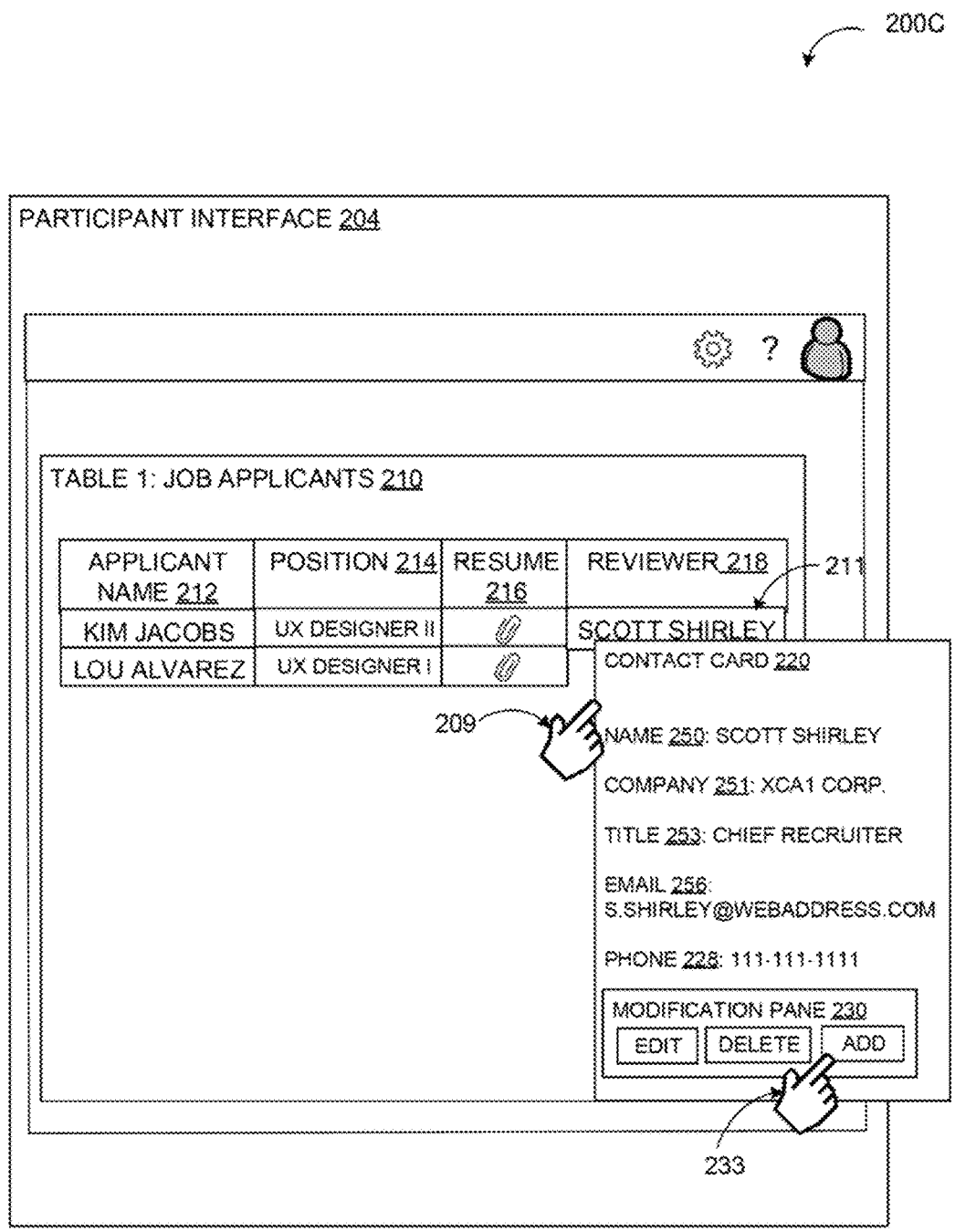
FIG. 2C is a display diagram illustrating display of a contact card in a vicinity of at least one field of a table in conjunction with a collaboration database, according to embodiments.

FIG. 2C is a display diagram illustrating display of a contact card in a vicinity of at least one field of a table in conjunction with a collaboration database, according to at least some embodiments disclosed herein.

As shown in a diagram 200C, if one of the suggestions is selected, a collaboration engine of a collaboration service may provide additional information associated with the selected suggestion to be displayed on a contact card 220 on a participant interface 204. The contact card 220 may be provided in a vicinity of the field 211 (or the cell) on a first table 210.

As described previously, the first table 210 may include several columns, such as a first column 212, a second column 214, a third column 216, and a fourth column 218. The first column 212 may include a name of an applicant. The second column 214 may include a job position the name of the applicant is applying for. The third column 216 may include an attached resume or may not include an attached resume. The fourth column 218 may include a name of a reviewer of the resume of the applicant.

In some examples, the collaboration engine may allow a participant to provide the additional information to the contact card 220 by an input action 209. The input action 209 may include a textual input, a gesture input, a voice command, and/or gyroscopic input. The additional information may include a name 250 (e.g., "Scott Shirley"), a company 251 (e.g., "XCA1 Corp."), a title 253 (e.g., Chief Recruiter), an email address 256 (e.g., s.shirley@webaddress.com), a telephone number 228 (e.g., 111-111-1111), an address (e.g., a residential address or a business address), a salary, a global positioning system (GPS) identifier, a graphic file, an audio file, video files, notes, a map, a link to a website, an attachment, and/or another communication identifier. The other communication identifier may include anything customizable that the participant wishes to include.

In some examples, the first table 210 may include travel data associated with employees of a company attending a networking event. The first table 210 may include columns associated with hotel accommodations for each employee, an address of the networking event, a choice type column associated with a flight status of each employee, a job title associated with each employee, a name of each employee, a telephone number associated with each employee, and an email address associated with each employee, among others. The choice type column may be updated in real-time based on the flight status of each employee, with a status such as, "in route," "delayed," "at starting location," "at destination location," etc. In other examples, the status may be updated using the status and/or an approximate arrival time to the destination location (e.g., "will arrive in approximately 25 minutes"). The collaboration database engine may be configured to retrieve information from a GPS coupled to the computing device of each employee in order to populate each cell of the choice type column with a status of the respective employee's flight.

In other examples, a modification pane 230 may be located on the contact card 220. The collaboration engine may receive an input action 233 executed on the modification pane 230. In response, the collaboration engine may add, edit, or delete the additional information from the contact card 220.

Figure 2D:
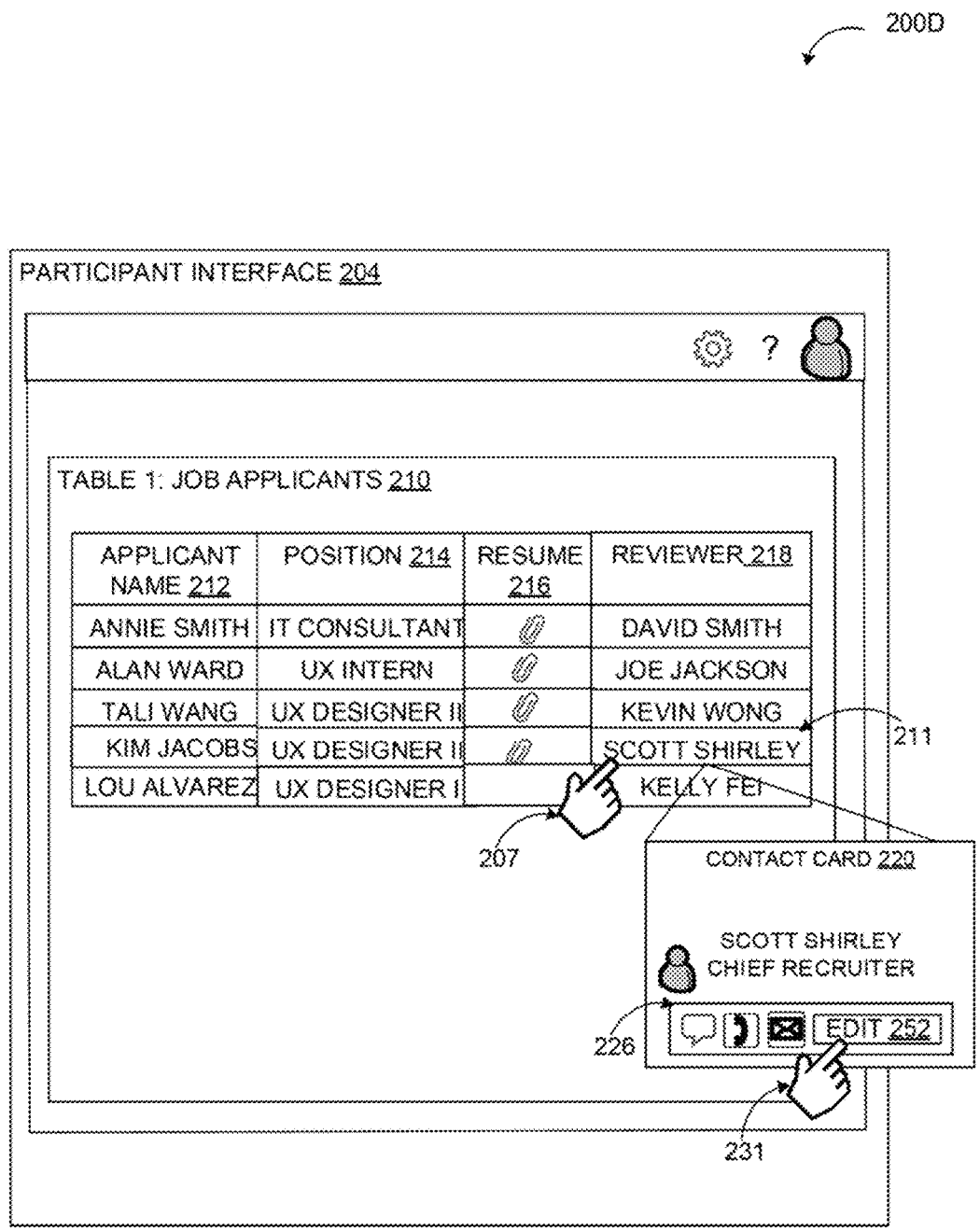
FIG. 2D is a display diagram illustrating modifications executed on a contact card located in a vicinity of at least one field of a table in conjunction with a collaboration database, according to embodiments.

FIG. 2D is a display diagram illustrating modifications executed on a contact card located in a vicinity of at least one field of a table in conjunction with a collaboration database, according to at least some embodiments disclosed herein.

As shown in a diagram 200D, the collaboration engine may be configured to detect a presentation of a first table 210 on the participant interface 204. The first table 210 may include parameters associated with applicants for a job. The first table 210 may include several columns, such as a first column 212 (e.g., a name of an applicant for a job), a second column 214 (e.g., a job position the applicant is applying for), a third column 216 (e.g., an attached resume), and a fourth column 218 (e.g., a name of a reviewer of the resume of the applicant).

In some examples, the collaboration engine may detect a participant interest in the field 211 (or the cell) on the first table 210 based on an action 235 executed on the field 211. The action 235 may include one of a hover action and a highlight action. In response, the collaboration engine may provide a contact card 220 with additional information, as discussed in FIG. 2C. A modification pane 226 may be present on the contact card 220.

In other examples, the participant may wish to modify the additional information. The collaboration engine may detect another action 231 executed on an edit graphical icon 252 of the modification pane 226 to add, delete, or modify the additional information on the contact card 220.

Figure 3A:
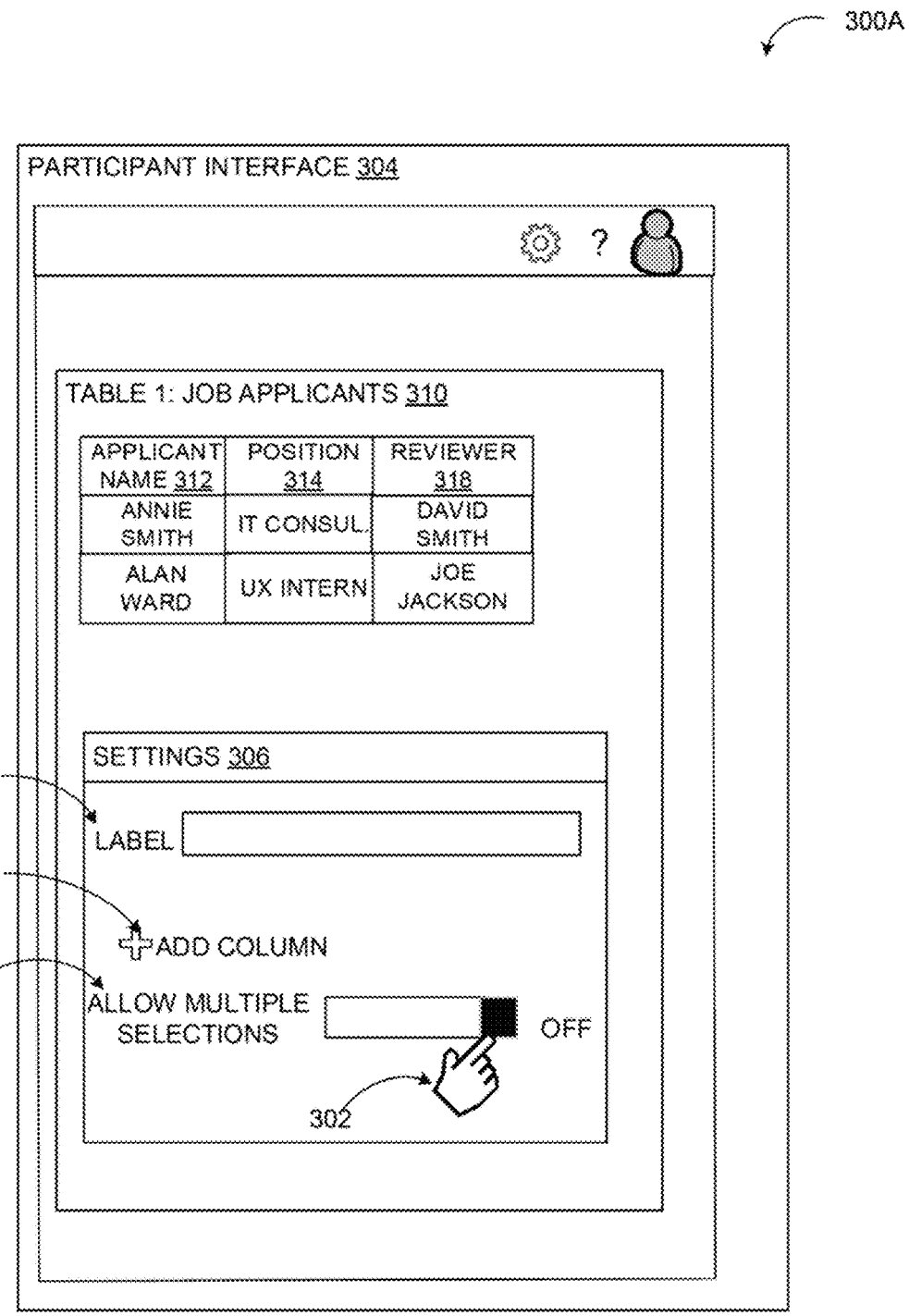
FIG. 3A is a display diagram illustrating modifications executed on a participant interface to modify a table in conjunction with a collaboration database, according to embodiments.

FIG. 3A is a display diagram illustrating modifications executed on a participant interface to modify a table in conjunction with a collaboration database, according to at least some embodiments disclosed herein.

As shown in a diagram in 300A, a collaboration service may include a collaboration engine. The collaboration service may be configured to be integrated with an application. A participant may execute an application through a computing device. The collaboration service may be configured to interact with the application over one or more networks. A participant interface 304 may facilitate communication over the one or more networks and between the collaboration service and the application.

In some examples, the collaboration engine may be configured to detect a presentation of a first table 310. The first table 310 may include several columns, such as a first column 312 (e.g., a name of an applicant), a second column 314 (e.g., a job position the name of the applicant is applying for), and a third column 318 (e.g., a name of a reviewer of a resume of the applicant).

In other examples, the collaboration engine may allow a participant to customize the first table 310 by modifying settings 306 associated with the first table 310. In some examples, the collaboration engine may allow the participant to modify a label 325 of columns and/or rows of the first table 310. In other examples, the collaboration engine may detect an action executed on an "add option" 350 graphical icon associated with the settings 306 of the application. In response, the collaboration engine may add or delete options to data from the first table 310. For example, a second title may be added for a person.

Figure 3B:
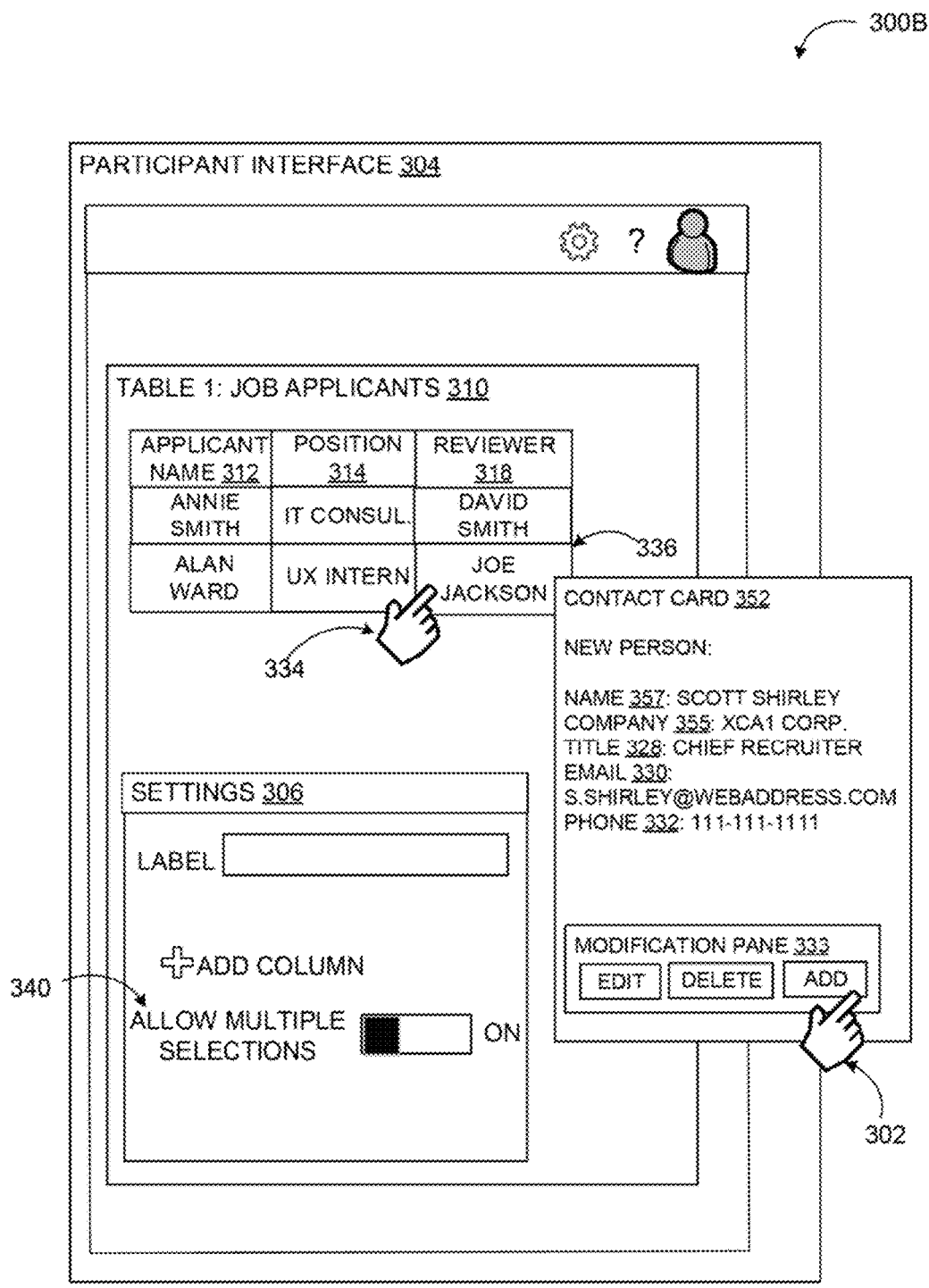
FIG. 3B is a display diagram that provides information associated with another person to a field of a table in conjunction with a collaboration database, according to embodiments.

FIG. 3B is a display diagram that provides information associated with another person to a field of a table in conjunction with a collaboration database, according to at least some embodiments disclosed herein.

As shown in a diagram in 300B, the collaboration engine may be configured to detect a presentation of a first table 310. The first table 310 may include several columns, such as a first column 312 (e.g., a name of an applicant), a second column 314 (e.g., a job position the name of the applicant is applying for), and a third column 318 (e.g., a name of a reviewer of a resume of the applicant).

As described previously in FIG. 3A, the collaboration engine may detect execution of a modification action on an "allow multiple selections" 340 graphical icon in settings 306 on the participant interface 304 to allow more than one graphical icon associated with a person or an entity to be displayed in a select field 336 (or cell) on the participant interface 304. In another example, the collaboration engine may detect execution of the modification action on the "allow multiple selections" 340 graphical icon in the settings 306 on the participant interface 304 to allow more than one textual representation to be displayed in the select field 336 (or cell) on the participant interface 304, where the textual representation is associated with the person or the entity. Then, the collaboration engine may detect an input action 334 executed on the select field 336. The select field 336 may include one or more initial letters associated with a person or an entity. In the diagram 300B, the select field 336 includes the one or more initial letters associated with the person (e.g., "Joe Jackson"). The input action 334 may include the addition of one or more initial letter associated with another person (e.g., "Scott Shirley") or another entity into the select field 336.

The collaboration engine may allow the participant to input additional information associated with the other person on a contact card 352 displayed in a vicinity of the select field 336. The additional information may include a name 357 of the other person (e.g., "Scott Shirley"), a company 355 associated with the other person (e.g., "XCA1 Corp."), a title 328 associated with the other person (e.g., "Chief Recruiter"), an email address 330 associated with the other person (e.g., s.shirley@webaddress.com), and a telephone number 332 associated with the other person (e.g., "111-111-1111").

In other examples, a modification pane 333 may be located on the contact card 352. The collaboration engine may also allow the participant to execute the input action 302 on the modification pane 333 to edit, delete, and/or add the additional information associated with the other person.

Figure 3C:
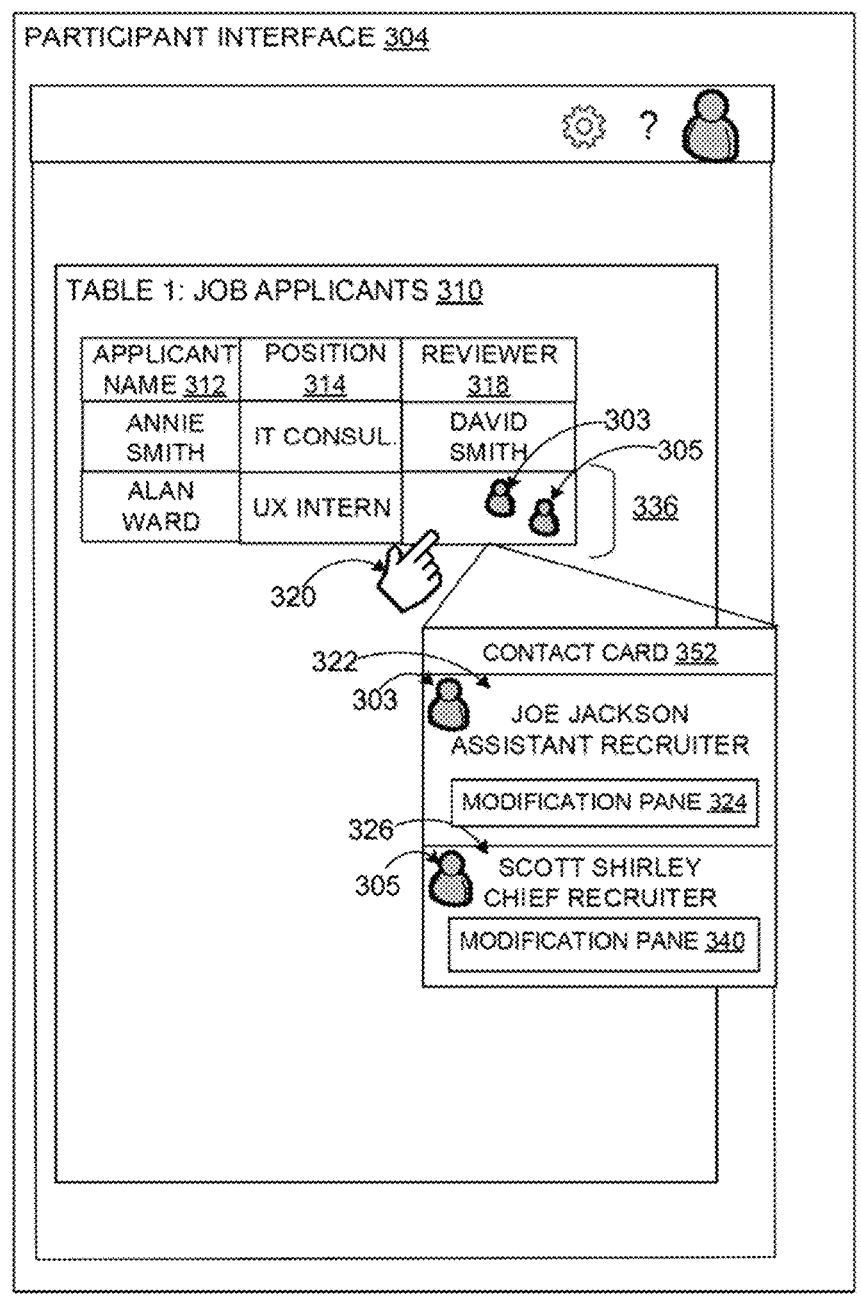
FIG. 3C is a display diagram illustrating a contact card displaying information associated with a first person and a second person, the contact card being located within a vicinity of at least one field of a table in conjunction with a collaboration database, according to embodiments.

FIG. 3C is a display diagram illustrating a contact card displaying information associated with a first person and a second person, the contact card being located within a vicinity of at least one field of a table in conjunction with a collaboration database, according to at least some embodiments disclosed herein.

As shown in a diagram 300C, a collaboration engine may detect an execution of an addition of additional information associated with another person on the contact card 352 on a participant interface 304. In response, a first graphical icon 303 and a second graphical icon 305 may be displayed in the select field 336 (or the cell) in a first table 310. The first graphical icon 303 may be associated with a first person and/or a first entity. The second graphical icon 305 may be associated with a second person and/or a second entity. The first graphical icon 303 and the second graphical icon 305 may be distinguished with a textual scheme, a graphical scheme, an audio scheme, an animation scheme, a coloring scheme, a highlighting scheme, and/or a shading scheme, among others. It should be noted that other elements and/or text may be used to distinguish between the first graphical icon 303 and the second graphical icon 305.

The collaboration engine may allow a participant to execute an action 320 on the select field 336 (or the cell). The action 320 may include a hover action, an input action, and/or a highlight action. In response, the collaboration engine may display the contact card 352 on the participant interface 304. The contact card 352 may display the first graphical icon 303 and the second graphical icon 305. The contact card 352 may also display a first set of additional information 322 and a second set of additional information 326. The first set of additional information 322 may be associated with the first person and/or the first entity. The second set of additional information 326 may be associated with the second person and/or the second entity. The first set of additional information 322 and/or the second set of additional information 326 may include textual data, audio data, and/or graphical data. The first set of additional information 322 and the second set of additional information 326 may include a name, an address, an email address, a title, a telephone number, a salary, a global positioning system (GPS) identifier, a graphic file, an audio file, notes, a map, a link to a website, an attachment, and/or another communication identifier.

The collaboration engine may provide an interactive functionality associated with the first set of additional information 322 and the second set of additional information 326 through the contact card 352 upon selection of the select field 336 (or the cell) when the first table 310 is presented. The interactive functionality may include an initiation of a communication session, a display of an address on a map, a display of a location of a participant on the map, a display of a location of an entity on the map, an initiation of a search for information associated with the participant through a search engine, and/or initiation of a search for information associated with the entity through the search engine.

The collaboration engine may allow the participant to distinguish the first set of additional information 322 from the second set of additional information 326 using a textual scheme, a graphical scheme, an audio scheme, an animation scheme, a coloring scheme, a highlighting scheme, and/or a shading scheme, among others. In other examples, the collaboration engine may allow the participant to distinguish a subset of the first set of additional information 322 or a subset of the second set of additional information 326 using one or more schemes. The collaboration engine may also allow the participant to modify the first set of additional information 322 by executing an input action on a first modification pane 324. In other examples, the collaboration engine may also allow the participant to modify the second set of additional information 326 by executing another input action on a second modification pane 340.

Figure 4A:
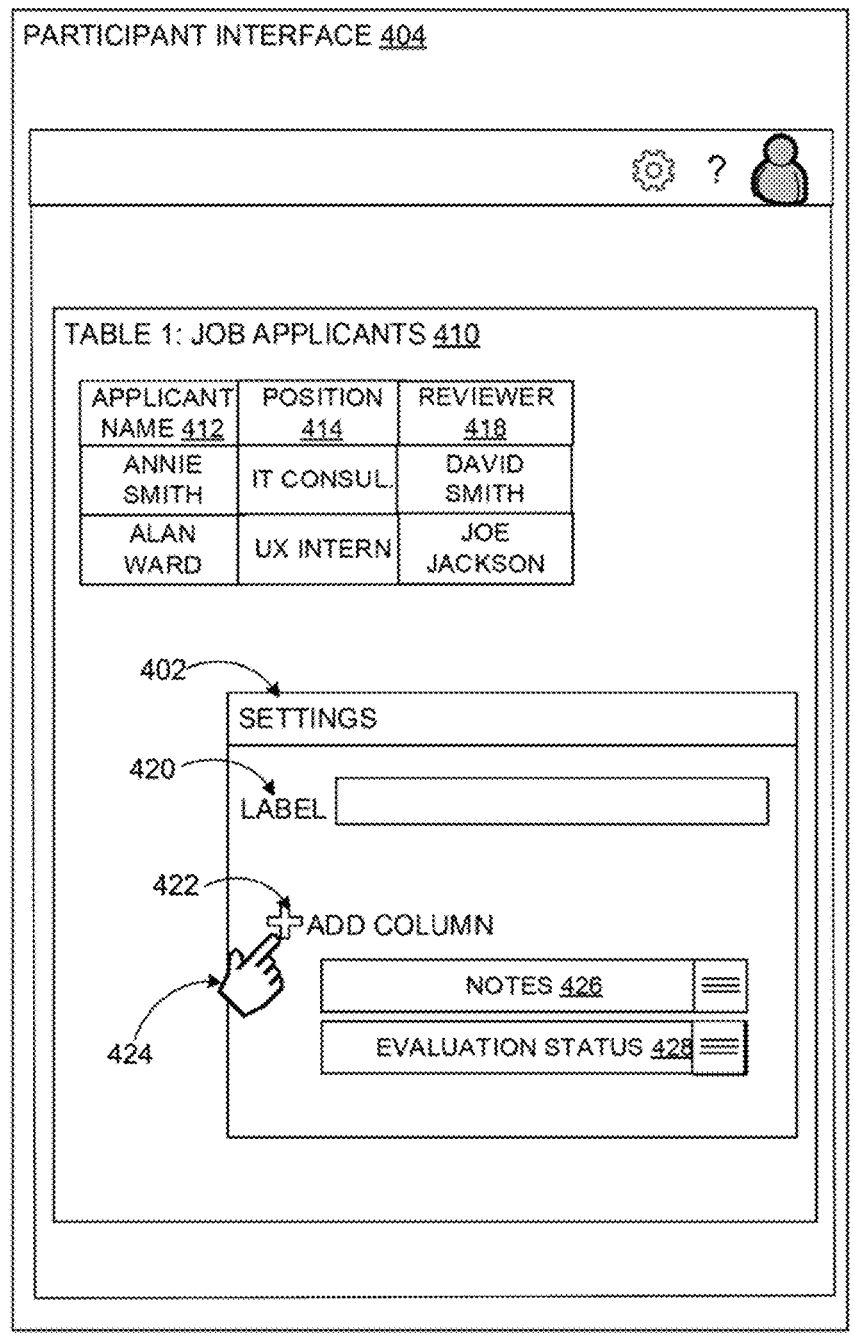
FIG. 4A and FIG. 4B illustrate display diagrams showing execution of a modification to rows and/or columns of a table in conjunction with a collaboration database to modify a presentation of the table, according to embodiments.
Figure 4B:
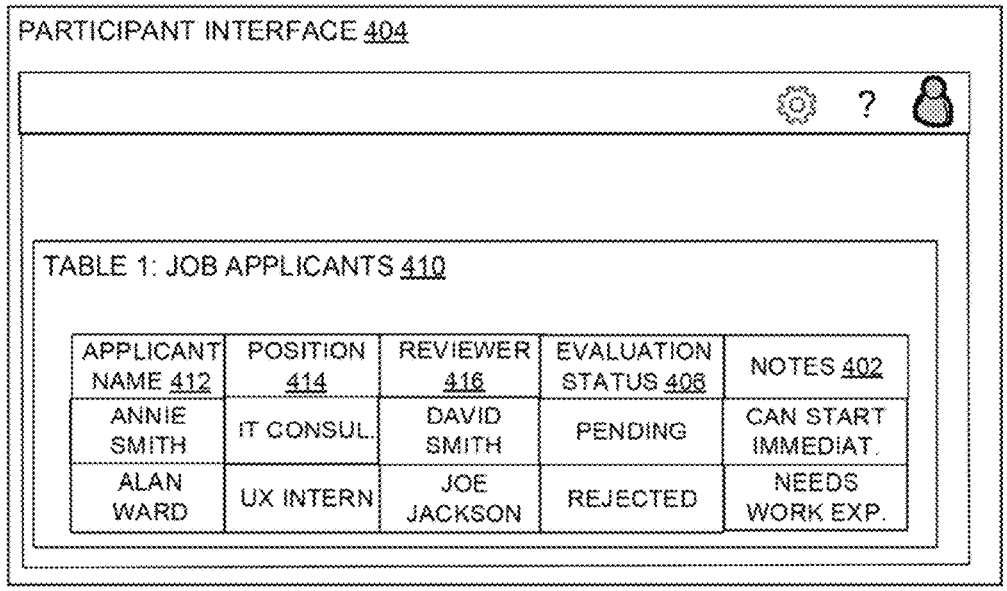

FIG. 4A and FIG. 4B illustrate display diagrams showing execution of a modification to rows and/or columns of a table in conjunction with a collaboration database to modify a presentation of the table, according to embodiments;

As shown in a diagram 400A, a collaboration service may include a collaboration engine. The collaboration service may be configured to be integrated with an application. A participant may execute an application through a computing device. The collaboration service may be configured to interact with the application over one or more networks. A participant interface 404 may facilitate communication over the one or more networks and between the collaboration service and the application.

In some examples, the collaboration engine may be configured to detect a presentation of a first table 410. The first table 410 may include a first column 412 (e.g., applicant's name), a second column 414 (e.g., position the applicant is applying for), and a third column 418 (e.g., reviewer of applicant's file and resume).

The collaboration engine may allow a participant to modify settings 402 associated with the application to modify a display of the first table 410. In some examples, the collaboration engine may allow the participant to add or delete rows, fields, or columns in the first table 410. In other examples, the collaboration engine may detect an execution of an input action on a label entry box 420 in the settings 402 to re-label a specified column of the first table 410.

In another example, the collaboration engine may allow the participant to execute an input action 424 on an "add column" 422 graphical icon on the settings 402 of the participant interface 404 to add one or more columns (e.g., a notes column 426, an evaluation status column 428, etc.) to the first table 410.

As shown in a diagram 400B, in response to the execution of the action to add the notes column 426 and the evaluation status column 428, the collaboration engine added the columns to the first table 410, resulting in an updated table.

Figure 5A:
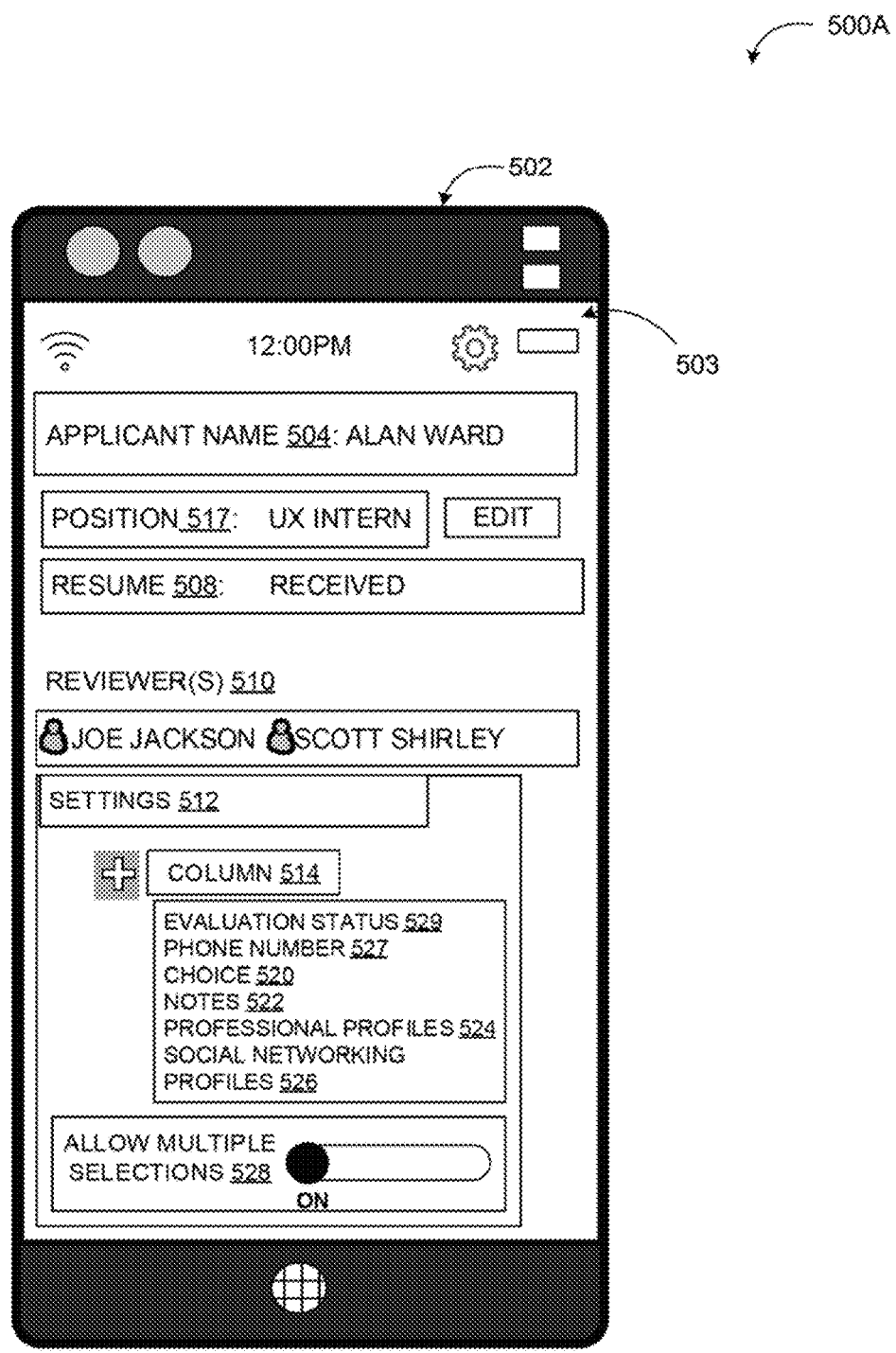
FIG. 5A is a display diagram illustrating modifications executed on a participant interface of a mobile computing device to modify a table in conjunction with a collaboration database, according to embodiments.

FIG. 5A is a display diagram illustrating modifications executed on a participant interface of a mobile computing device to modify a table in conjunction with a collaboration database, according to at least some embodiments disclosed herein.

As shown in a diagram 500A, a mobile computing device 502 configured to provide data presentation functionality associated with a collaboration database is described. The mobile computing device 502 may include a memory configured to store instructions and one or more processors coupled to the memory. The one or more processors may be configured to execute, in conjunction with the instructions stored in the memory, an application 503 associated with a collaboration service. In some examples, the collaboration engine may automatically modify a presentation of the data in the table based on platform capabilities associated with the collaboration service.

The collaboration service may be configured to be integrated with the application 503. A participant may execute the application 503 through the mobile computing device 502. The collaboration service may be configured to interact with the application 503 over one or more networks. A participant interface may facilitate communication over the one or more networks and between the collaboration service and the application 503.

The application 503 may include several fields, such as an applicant's name 504 (e.g., "Alan Ward"), a position 517 (e.g., "UX Intern"), a resume 508 (e.g., received, pending, etc.), a list of reviewers 510 (e.g., "Joe Jackson, "Scott Shirley," etc.). The collaboration engine may allow the participant to configure settings 512 of the application 503, which may modify a design and/or a layout of a table. For example, the participant may add, edit, or remove columns 514. The columns 514 may include an evaluation status 529 (e.g., pending, evaluated, rejected, etc.), a phone number 527, a choice 520 (e.g., which may be customized by the participant), a notes 522, a professional profile 524, a social networking profile 526, as described previously.

Figure 5B:
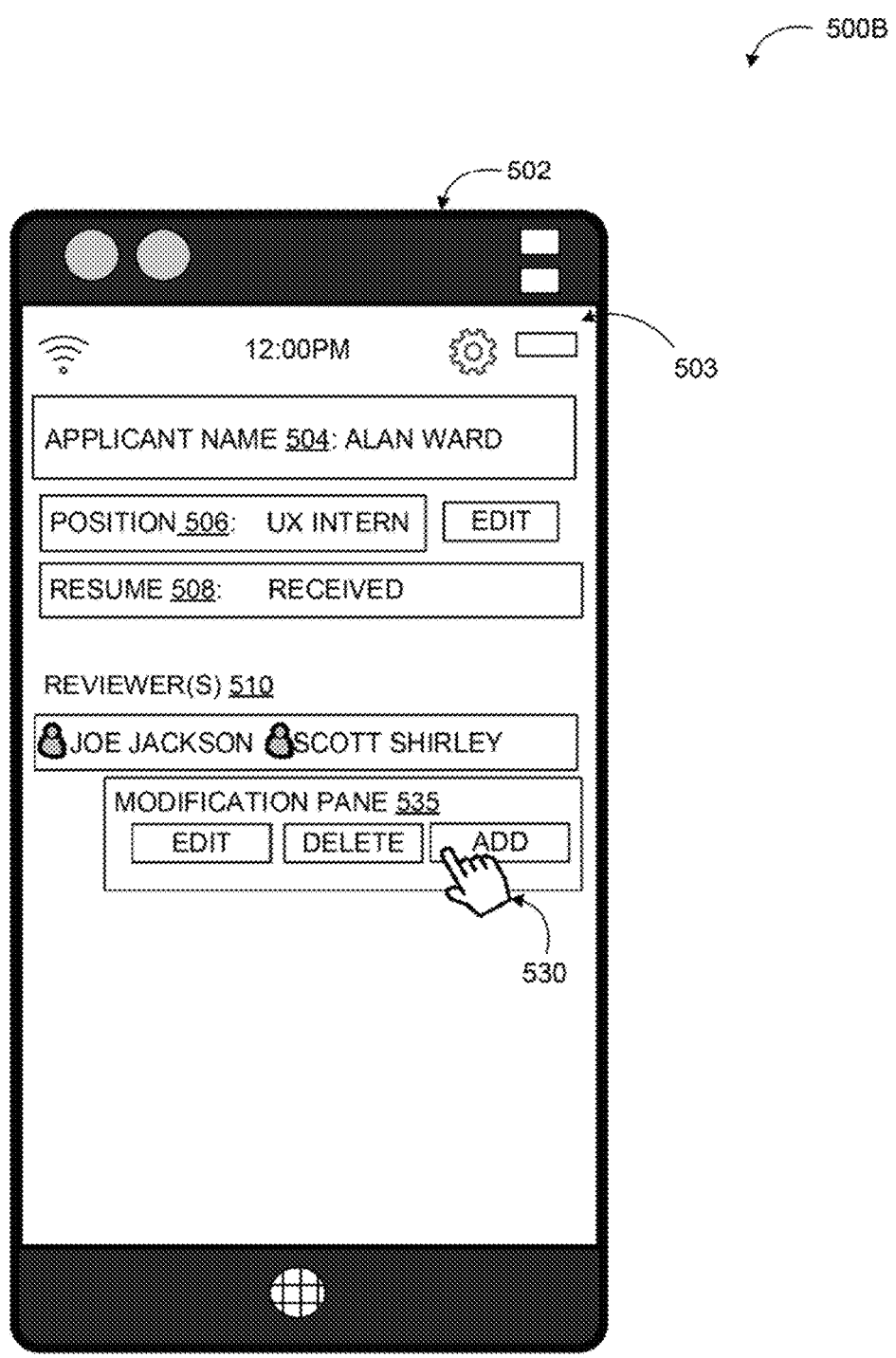
FIG. 5B, FIG. 5C, and FIG. 5D illustrate display diagrams showing detection of one or more initial letters associated with a person or an entity being input into at least one field of a table in conjunction with a collaboration database, according to embodiments.
Figure 5C:
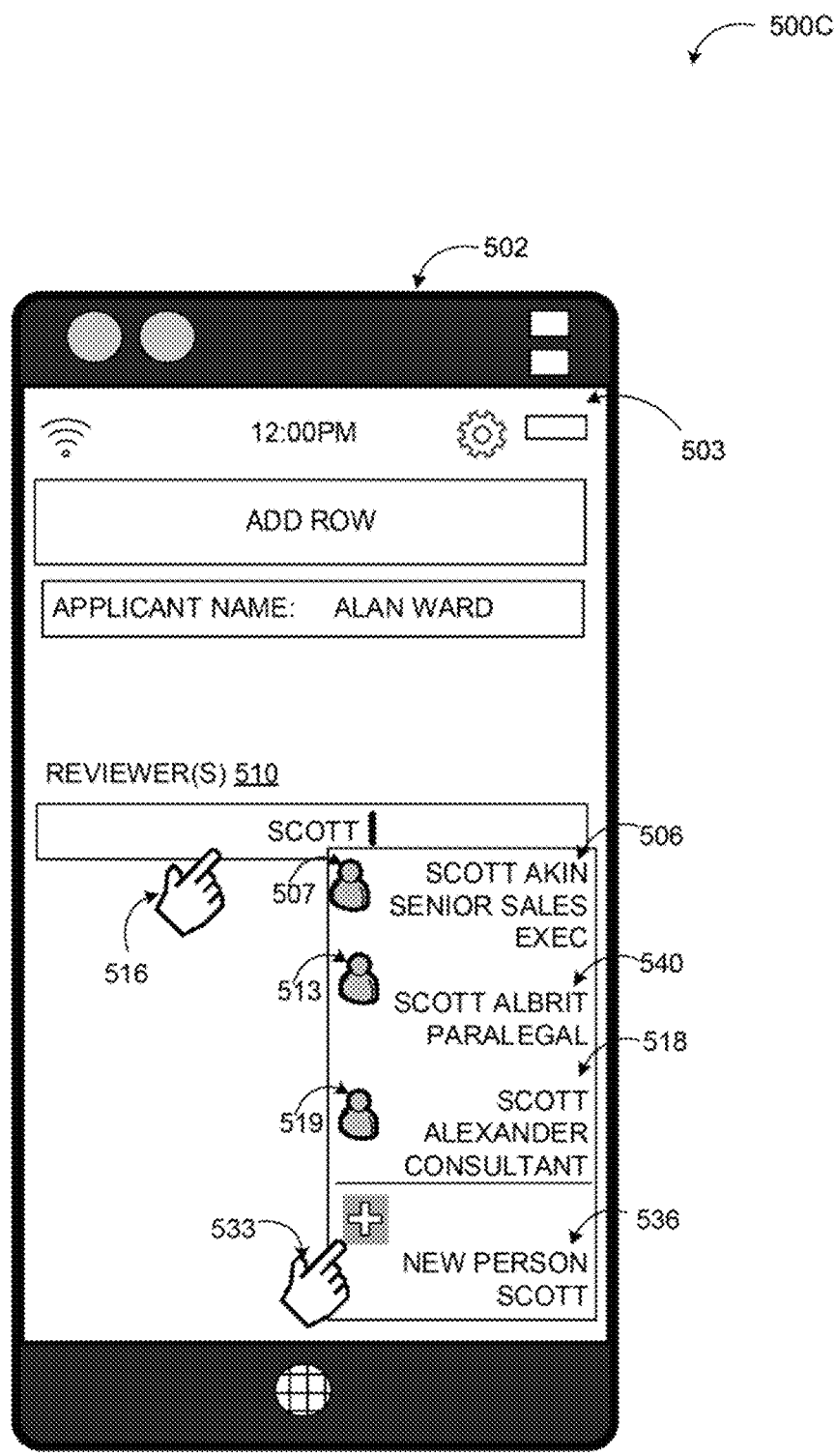
Figure 5D:
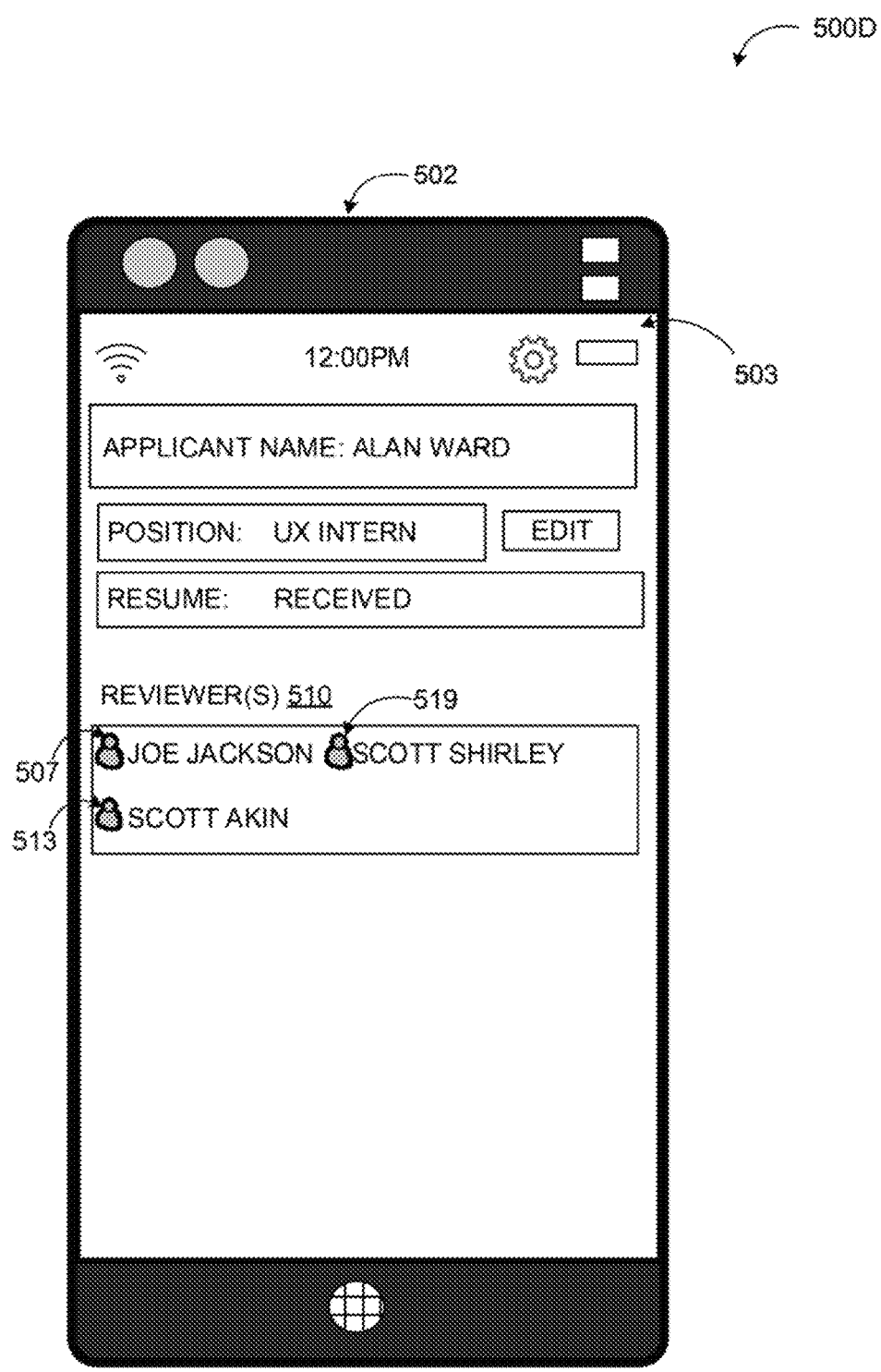

FIG. 5B, FIG. 5C, and FIG. 5D illustrate display diagrams showing detection of one or more initial letters associated with a person or an entity being input into at least one field of a table in conjunction with a collaboration database, according to at least some embodiments disclosed herein.

As shown in a diagram 500B, a participant may wish to add another person or another entity to a select cell in a table on a mobile computing device 502. To do so, the participant may execute an input action 530 on a modification pane 535. The input action 530 may include a textual entry input, among other examples.

As shown in a diagram 500C, a collaboration engine may detect one or more initial letters (e.g., "SCOTT") associated with a person or an entity being input into a select field in a table through use of an input action 516. In response, the collaboration engine may detect a type of entry. The type of entry may include a name, an address, an email address, a title, a telephone number, and/or another communication identifier. The collaboration engine may then search through a local data source for matching entries. The local source may include a personal address book, an organizational directory, and/or the collaborative database.

The collaboration engine may then provide a first suggestion 506, a second suggestion 540, and a third suggestion 518. The first suggestion 506, the second suggestion 540, and the third suggestion 518 may be displayed on a drop-down menu and/or a textual entry box on the participant interface. The first suggestion 506, the second suggestion 540, and/or the third suggestion 518 may be distinguished by one or more schemes, as described previously. Additionally, the first suggestion 506, the second suggestion 540, and/or the third suggestion 518 may be distinguished by graphical icons. For example, the first suggestion 506 may be associated with a first graphical icon 507, the second suggestion 540 may be associated with a second graphical icon 513 and the third suggestion 518 may be associated with a third graphical icon 519. The first graphical icon 507, the second graphical icon 513, and the third graphical icon 519 may also be displayed on the drop-down menu and/or the textual entry box.

In some examples, the first suggestion 506, the second suggestion 540, and the third suggestion 518 may be identified based on execution of an intelligent learning algorithm, a machine learning algorithm, and/or a machine learning technique on the one or more initial letters (e.g., "SCOTT"). The machine learning techniques may include pattern recognition and computational learning theory, among others. The machine learning algorithms may learn and make predictions. Common machine learning algorithms may include supervised learning algorithms, unsupervised learning algorithms, and reinforcement learning algorithms. Some of the machine learning algorithms may include linear regression algorithms, logistic regression algorithms, decision tree algorithms, support vector machine (SVM) algorithms, Naive Bayes algorithms, a K-nearest neighbors (KNN) algorithm, a K-means algorithm, a random forest algorithm, dimensionality reduction algorithms, and a Gradient Boost & Adaboost algorithm, among others.

The collaboration engine may also allow the participant to input additional information that is associated with the first suggestion 506, the second suggestion 540, and/or the third suggestion 518. In other examples, the participant may wish to add a new suggestion 536 to the select field in the table. The participant may execute a selection action 533 on the drop-down menu and/or a textual entry box to add the new suggestion to the field.

As shown in a diagram 500D, in response to the addition of the new suggestion, a first graphical icon 507, a second graphical icon 513, and a third graphical icon 519 may be displayed in the select field in the table on the participant interface. The first graphical icon 507 may be associated with a first person and/or a first entity. The second graphical icon 513 may be associated with a second person and/or a second entity. The third graphical icon 519 may be associated with a third person and/or a third entity.

The example scenarios and schemas in FIG. 1 through FIG. 5D are shown with specific components, data types, and configurations. Embodiments are not limited to systems according to these example configurations. Providing data presentation functionality associated with a collaboration database may be implemented in configurations employing fewer or additional components in applications and participant interfaces. Furthermore, the example schema and components shown in FIG. 1 through FIG. 5D and their sub-components may be implemented in a similar manner with other values using the principles described herein.

Figure 6:
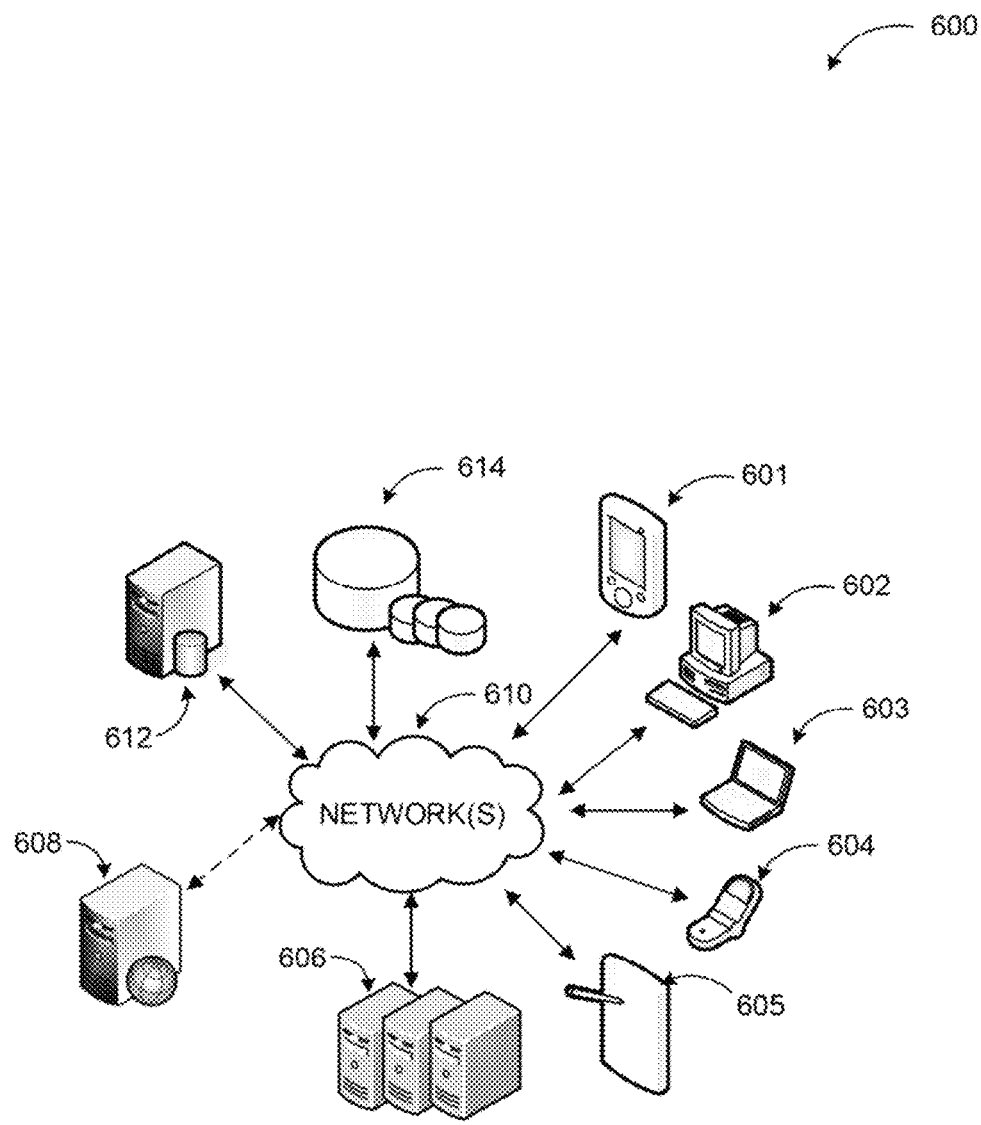
FIG. 6 is a simplified networked environment, where a system according to embodiments may be implemented.

FIG. 6 is a simplified networked environment, where a system according to embodiments may be implemented.

In addition to locally installed applications (e.g., the application 106 of FIG. 1), a collaboration database engine may also be employed in conjunction with hosted applications and services (e.g., a productivity suite application and/or a collaboration database service) that may be implemented via software executed over one or more servers 606 or individual server 608, as illustrated in diagram 600. A hosted service or application may communicate with client applications on individual client devices 601-605, such as a handheld computer 601, a desktop computer 602, a laptop computer 603, a smart phone 604, and a tablet computer 605, among other client devices. The hosted service or the application may communicate with the applications through one or more networks 610 and present a participant interface to participants.

The individual client devices 601-605 may be used to access the functionality provided by the hosted service or the application. The one or more of the servers 606 or the individual server 608 may be used to provide a variety of services, as previously discussed. Relevant data may be stored in one or more data stores (e.g. a data store 614), which may be managed by the one or more servers 606 or by a database server 612.

The one or more networks 610 may comprise any topology of servers, clients, Internet service providers, and communication media. A system according to embodiments may have a static or dynamic topology. The one or more networks 610 may include a secure network such as an enterprise network, an unsecure network such as a wireless open network, or the Internet. The one or more networks 610 may also coordinate communication over other networks, such as PSTN or cellular networks. The one or more networks 610 may provide communication between the nodes, as described herein. By way of example, and not limitation, the one or more networks 610 may include wireless media such as acoustic, RF, infrared and other wireless media.

Many other configurations of computing devices, applications, engines, data sources, and data distribution systems may be employed for providing data presentation functionality associated with a collaboration database. Furthermore, the networked environments discussed in FIG. 6 are for illustration purposes only. Embodiments are not limited to the example applications, engines, or processes.

Figure 7:
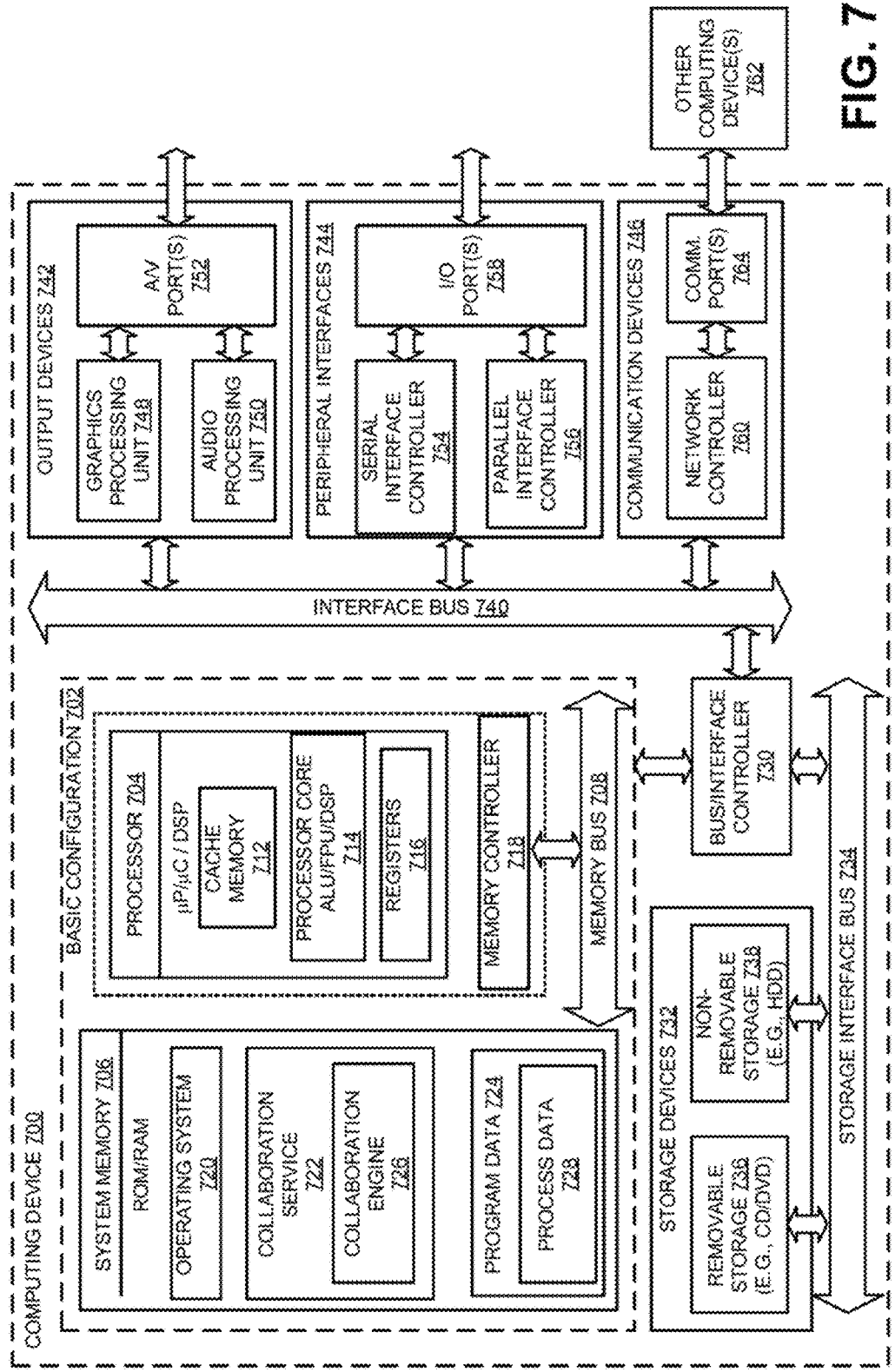
FIG. 7 is a block diagram of an example computing device, which may be used for providing data presentation functionality associated with a collaboration database, according to embodiments.

FIG. 7 is a block diagram of an example computing device, which may be used for providing data presentation functionality associated with a collaboration database, according to embodiments.

For example, a computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communication between the processor 704 and the system memory 706. The example basic configuration 702 may be illustrated in FIG. 6 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The one or more processor cores 714 may (each) include an arithmetic logic unit (ALU), a floating point unit (FPU), a digital signal processing core (DSP Core), or any combination thereof. An example memory controller 718 may also be used with the processor 704, or in some implementations, the example memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, a collaboration service 722, and a program data 724. The collaboration service 722 may include a collaboration engine 726, which may be an integrated module of the collaboration service 722. The collaboration engine 726 may be configured to detect a presentation of a table in conjunction with the collaboration database and at least one field in the table that includes people type data. The collaboration engine 726 may also, in response to detecting one or more initial letters associated with a person or an entity being input into the at least one field, detect a type of entry, search through a local data source for matching entries, and provide suggestions to be displayed. The type of entry may include a name, an address, an email address, a title, a phone number, or another communication identifier. The collaboration engine 726 may also, if one of the suggestions is selected, provide additional information associated with the selected suggestion to be displayed on a contact card in a vicinity of the at least one field. The collaboration engine 726 may further provide an interactive functionality associated with the additional information through the contact card upon selection of the at least one field when the table is presented. The program data 724 may include process data 728. The process data may include, among other data, suggestion data, as described herein.

The computing device 700 may have additional features or functionality, and additional interfaces to facilitate communications between the example basic configuration 702 and any desired devices and interfaces. For example, a bus/interface controller 730 may be used to facilitate communications between the example basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the example basic configuration 702 via the bus/interface controller 730. Some of the one or more output devices 742 include a graphics processing unit 748 and an audio processing unit 750, which may be configured to communicate to various external devices such as a display or speakers via one or more A/V ports 752. The one or more peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 766 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer, which includes any of the above functions. The computing device 700 may also be implemented as a personal computer including both laptop computer and non-laptop computer configurations.

Example embodiments may also include methods for providing data presentation functionality associated with a collaboration database. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
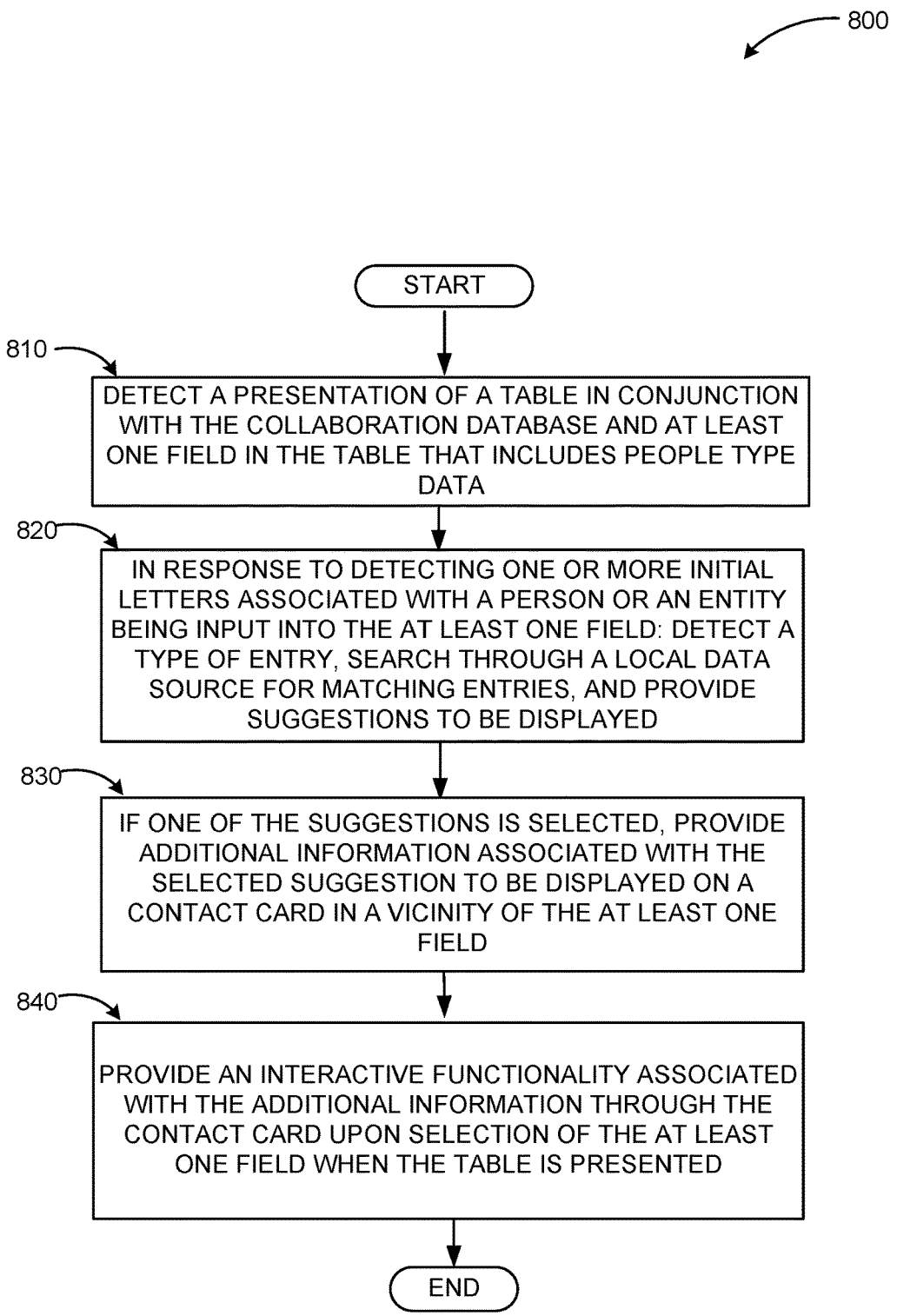
FIG. 8 is a logic flow diagram illustrating a process for providing data presentation functionality associated with a collaboration database, according to embodiments.

FIG. 8 is a logic flow diagram illustrating a process for providing data presentation functionality associated with a collaboration database, according to embodiments.

A process 800 may be implemented on a computing device (e.g., the computing device 700 in FIG. 7), a server, or with another system. In some examples, the system may include a server. The server may include components, such as a communication module, a memory, and a processor coupled to the memory. The communication module may be configured to facilitate communication between a collaboration service, a plurality of client applications, and one or more other services.

The memory may be configured to store instructions. The processor may be configured to execute, in conjunction with the instructions stored in the memory, a collaboration service and a collaboration engine integrated with the collaboration service. The collaboration service may be configured to enable creation and collaboration of contents on custom databases. The collaboration service may also be integrated with an application (e.g., a productivity application) executed on a client device or a computing device. The client device or the computing device may be associated with a participant so that the participant may create collaborative content through the application that may be shared and edited through the collaboration service.

The process 800 begins with operation 810, where the collaboration engine may detect a presentation of a table in conjunction with the collaboration database and at least one field in the table. The at least one field in the table may include people type data. The people type data may include contact information and context information associated with a person or an entity. The entity may include one of an organization, a company, and a group.

At operation 820, the collaboration engine may detect one or more initial letters associated with the person or the entity being input into the at least one field. In response, the collaboration engine may detect a type of entry, search through a local data source for matching entries, and may provide suggestions to be displayed. The type of entry may include a name, an address, an email address, a title, a telephone number, or another communication identifier. The local data source may include a personal address book, an organizational directory, or the collaborative database.

At operation 830, the collaboration engine may detect one of the suggestions being selected. In response, the collaboration engine may provide additional information associated with the selected suggestion to be displayed on a contact card in a vicinity of the at least one field. In some examples, the collaboration engine may detect a participant interest in one of the suggestions based on one of a hover action and a highlight action executed on the displayed suggestion. In response, the collaboration engine may provide the additional information. The additional information may include a name, an address, an email address, a title, a telephone number, a salary, a global positioning system (GPS) identifier, a graphic file, an audio file, notes, a map, a link to a website, an attachment, and/or another communication identifier.

At operation 840, the collaboration engine may provide an interactive functionality associated with the additional information through the contact card upon selection of the at least one field when the table is presented. The interactive functionality may include an initiation of a communication session, a display of an address on a map, a display of a location of a participant on the map, a display of a location of an entity on the map, an initiation of a search for information associated with the participant through a search engine, and/or an initiation of a search for information associated with the entity through the search engine.

The operations included in process 800 are for illustration purposes. Providing data presentation functionality associated with a collaboration database may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, an example server may be configured to provide data presentation functionality associated with a collaboration database. The example server may include a communication module, a memory, and a processor. The communication module may be configured to facilitate communication between a collaboration service, a plurality of client applications, and one or more other services. The memory may be configured to store instructions. The processor may be coupled to the memory. The processor may be configured to execute, in conjunction with the instructions stored in the memory, the collaboration service and a collaboration engine integrated with the collaboration service. The collaboration engine is configured to, at least, detect a presentation of a table in conjunction with the collaboration database and at least one field in the table that includes people type data. The collaboration engine is also configured to, in response to detecting one or more initial letters associated with a person or an entity being input into the at least one field: detect a type of entry, search through a local data source for matching entries, and provide suggestions to be displayed. If one of the suggestions is selected, the collaboration engine may be further configured to provide additional information associated with the selected suggestion to be displayed on a contact card in a vicinity of the at least one field. The collaboration engine may be further configured to provide an interactive functionality associated with the additional information through the contact card upon selection of the at least one field when the table is presented.

According to other embodiments, the collaboration engine may be further configured to, upon detecting a participant interest in one of the suggestions based on one of a hover action and a highlight action executed on the displayed suggestion, provide the additional information. The additional information may include a name, an address, an email address, a title, a telephone number, a salary, a global positioning system (GPS) identifier, a graphic file, an audio file, notes, a map, a link to a website, an attachment, and/or another communication identifier.

According to some embodiments, the collaboration engine may be further configured to automatically modify a presentation of the data in the table based on platform capabilities associated with the collaboration service. If a matching entry is not found at the local data source, the collaboration engine may be further configured to search through an external data source to locate the matching entry. The external data source may include a social network database, professional network database, and/or an external directory.

According to further embodiments, the collaboration engine may be further configured to provide the table created through an application executed on a mobile computing device in conjunction with the collaboration service. The people type data may include contact information and/or context information associated with one or more of the person or the entity. The entity may be one of an organization, a company, and a group.

According to additional embodiments, the local data source may include a personal address book, an organizational directory, and the collaborative database. The type of entry may include a name, an address, an email address, a title, a telephone number, and/or another communication identifier. The one or more other services may include a Global Positioning Service (GPS), a scheduling service, and a presence service.

According to some embodiments, a means for providing data presentation functionality associated with a collaboration database may be described, which may include a means for detecting a presentation of a table in conjunction with the collaboration database and at least one field in the table that includes people type data. In response to detecting one or more initial letters associated with a person or an entity being input into the at least one field: a means for detecting a type of entry may be described, a means for searching through a local data source for matching entries may be described, and a means for providing suggestions to be displayed may be described. The type of entry may include a name, an address, an email address, a title, a phone number, and another communication identifier. If one of the suggestions is selected, a means for providing additional information associated with the selected suggestion to be displayed on a contact card in a vicinity of the at least one field may be described. Further, a means for providing an interactive functionality associated with the additional information through the contact card upon selection of the at least one field when the table is presented may be described.

According to further embodiments, an example method to provide data presentation functionality associated with a collaboration database may be described. The example method may include process steps, such as, detecting a presentation of a table in conjunction with the collaboration database and at least one field in the table that includes people type data. In response to detecting one or more initial letters associated with a person or an entity being input into the at least one field, the example method may further include additional process steps, such as, detecting a type of entry, searching through a local data source for matching entries, and providing suggestions to be displayed. The type of entry may include a name, an address, an email address, a title, a phone number, and/or another communication identifier. If one of the suggestions is selected, the example method may include additional process steps, such as, providing additional information associated with the selected suggestion to be displayed on a contact card in a vicinity of the at least one field. The example method may further include additional process steps, such as, providing an interactive functionality associated with the additional information through the contact card upon selection of the at least one field when the table is presented.

According to some embodiments, the interactive functionality may include an initiation of a communication session, a display of an address on a map, a display of a location of a participant on the map, a display of a location of an entity on the map, an initiation of a search for information associated with the participant through a search engine, and/or an initiation of a search for information associated with the entity through the search engine. According to further embodiments, the example method may include other process steps, such as, implementing an intelligent learning algorithm on the one or more initial letters to identify the suggestions. The matching entries may share a keyword, a syntax modifier, and/or a portion of the keyword.

According to further embodiments, mobile computing devices to provide data presentation functionality associated with a collaboration database may be described. An example mobile computing device may include a memory and one or more processors. The memory may be configured to store instructions. The one or more processors may be coupled to the memory. The one or more processors may be configured to execute, in conjunction with the instructions stored in the memory, an application associated with a collaboration service. The application may be configured to, at least, detect a presentation of a table in conjunction with the collaboration database and at least one field in the table that includes people type data. In response to detecting one or more initial letters associated with a person or an entity being input into the at least one field, the application may further be configured to detect a type of entry, search through a local data source for matching entries, and provide suggestions to be displayed. The type of entry may include a name, an address, an email address, a title, a phone number, and/or another communication identifier. If one of the suggestions is selected, the application may be further configured to provide additional information associated with the selected suggestion to be displayed on a contact card in a vicinity of the at least one field. The application may be further configured to provide an interactive functionality associated with the additional information through the contact card upon selection of the at least one field when the table is presented.

According to some embodiments, the application associated with the collaboration service may be one of a word-processing application, a spreadsheet application, a presentation application, and a notebook application. Upon detecting a participant interest in one of the suggestions based on one of a hover action and a highlight action executed on the displayed suggestion, the application may be further configured to provide the additional information. The additional information may include a name, an address, an email address, a title, a telephone number, a salary, a global positioning system (GPS) identifier, a graphic file, an audio file, notes, a map, a link to a website, an attachment, and/or another communication identifier. If a matching entry is not found at the local data source, the application may be further configured to search through an external data source to locate the matching entry. The external data source may include a social network database, professional network database, and/or an external directory.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A server configured to provide data presentation functionality associated with a collaboration database, the server comprising:
   a communication module configured to facilitate communication between a collaboration service, a plurality of client applications, and one or more other services;
   a memory configured to store instructions; and
   a processor coupled to the memory, the processor configured to execute, in conjunction with the instructions stored in the memory, the collaboration service and a collaboration engine integrated with the collaboration service, wherein the collaboration engine is configured to:
      detect a presentation of a table in conjunction with the collaboration database and at least one field in the table that includes people type data;
      receive an input indicating a keyword associated with with a person or an entity;
      search through a local data source for an entry within the local data source that contains the keyword associated with the person or the entity;
      determine that the local data source does not contain the entry associated with the person or the entity;
      in response to determining that the local data source does not contain the entry associated with the person or the entity, search through an external data source for the entry that contains the keyword associated with the person or the entity;
      cause a display of a suggestion comprising data from the entry;
      in response to a selection of the suggestion, provide additional information associated with the suggestion on a contact card that is in a vicinity of the at least one field, wherein the additional information is received from the external data source or the local data source; and
      provide an interactive functionality to modify the at least one field in the table by the use of at least one user interface control in the contact card.

2. The server of claim 1, wherein the collaboration engine is further configured to:
   upon detecting a participant interest in one of the suggestions based on one of a hover action and a highlight action executed on the displayed suggestion, provide the additional information.

3. The server of claim 2, wherein the additional information includes one or more of a name, an address, an email address, a title, a telephone number, a salary, a global positioning system (GPS) identifier, a graphic file, an audio file, notes, a map, a link to a website, an attachment, and another communication identifier.

4. The server of claim 1, wherein the collaboration engine is further configured to:
   automatically modify a presentation of the data in the table based on platform capabilities associated with the collaboration service.

5. The server of claim 1, wherein the external data source includes one or more of a social network database, professional network database, and an external directory.

6. The server of claim 1, wherein the collaboration engine is further configured to:
   provide the table created through an application executed on a mobile computing device in conjunction with the collaboration service.

7. The server of claim 1, wherein the people type data includes contact information and context information associated with one or more of the person or the entity.

8. The server of claim 7, wherein the entity is one of an organization, a company, and a group.

9. The server of claim 1, wherein the local data source includes a personal address book, an organizational directory, and the collaborative database.

10. The server of claim 1, wherein a type of entry includes one of a name, an address, an email address, a title, a telephone number, and another communication identifier.

11. The server of claim 1, wherein the one or more other services include a Global Positioning Service (GPS), a scheduling service, and a presence service.

12. The server of claim 1, wherein the additional information displayed with the contact card comprises at least one of a company name, a title, an email address, or a phone number.

13. The server of claim 1, wherein the additional information is related to the person or the entity, and wherein the additional information displayed within the contact card indicates at least one of a company name, a title, an email address, or a phone number.

14. A method to provide data presentation functionality associated with a collaboration database, the method comprising:
- detecting a presentation of a table in conjunction with the collaboration database and at least one field in the table that includes people type data;
- receiving an input indicating a keyword associated with a person or an entity;
- searching through a local data source for an entry within the local data source that contains the keyword associated with the person or the entity;
- determining that the local data source does not contain the entry associated with the person or the entity;
- in response to determining that the local data source does not contain the entry associated with the person or the entity, searching through an external data source for the entry that contains the keyword associated with the person or the entity;
- causing a display of a suggestion comprising data from the entry;
- in response to a selection of the suggestion, providing additional information associated with the suggestion on a contact card that is in a vicinity of the at least one field, wherein the additional information is received from the external data source or the local data source; and
- providing an interactive functionality to modify the at least one field in the table by the use of at least one user interface control in the contact card.

15. The method of claim 14, wherein the interactive functionality includes one or more of: an initiation of a communication session, a display of an address on a map, a display of a location of a participant on the map, a display of a location of an entity on the map, an initiation of a search for information associated with the participant through a search engine and an initiation of a search for information associated with the entity through the search engine.

16. The method of claim 14, further comprising:
- implementing an intelligent learning algorithm on the one or more initial letters to identify the suggestions.

17. The method of claim 14, wherein the matching entries share one or more of a keyword, a syntax modifier, and a portion of the keyword.

18. A mobile computing device to provide data presentation functionality associated with a collaboration database, the mobile computing device comprising:
- a memory configured to store instructions; and
- one or more processors coupled to the memory, the one or more processors configured to execute, in conjunction with the instructions stored in the memory, an application associated with a collaboration service, wherein the application is configured to:
  - detect a presentation of a table in conjunction with the collaboration database and at least one field in the table that includes people type data;
  - receive an input indicating a keyword associated with a person or an entity being input into the at least one field;
  - search through a local data source for an entry within the local data source that contains the keyword associated with the person or the entity;
  - determine that the local data source does not contain the entry associated with the person or the entity;
  - in response to determining that the local data source does not contain the entry associated with the person or the entity, search through an external data source for the entry that contains the keyword associated with the person or the entity;
  - cause a display of a suggestion comprising data from the entry;
  - in response to a selection of the suggestion, provide additional information associated with the suggestion on a contact card that is in a vicinity of the at least one field, wherein the additional information is received from the external data source or the local data source; and
  - provide an interactive functionality to modify the at least one field in the table by the use of at least one user interface control in the contact card.

19. The mobile computing device of claim 18, wherein the application associated with the collaboration service is one of a word-processing application, a spreadsheet application, a presentation application, and a notebook application.

20. The mobile computing device of claim 18, wherein the application is further configured to:
- upon detecting a participant interest in one of the suggestions based on one of a hover action and a highlight action executed on the displayed suggestion, provide the additional information, wherein the additional information includes one or more of a name, an address, an email address, a title, a telephone number, a salary, a global positioning system (GPS) identifier, a graphic file, an audio file, notes, a map, a link to a website, an attachment, and another communication identifier.

* * * * *